(12) United States Patent
Ernst et al.

(10) Patent No.: US 10,725,631 B2
(45) Date of Patent: Jul. 28, 2020

(54) SYSTEMS AND METHODS OF SELECTING A VIEW FROM A PLURALITY OF CAMERAS

(71) Applicant: PIXIA CORP., Reston, VA (US)

(72) Inventors: Rudolf O. Ernst, Leesburg, VA (US); James White, Manassas, VA (US)

(73) Assignee: PIXIA CORP., Reston, VA (US)

( * ) Notice: Subject to any disclaimer, the term of this patent is extended or adjusted under 35 U.S.C. 154(b) by 136 days.

(21) Appl. No.: 15/142,720

(22) Filed: Apr. 29, 2016

(65) Prior Publication Data

US 2016/0320951 A1 Nov. 3, 2016

Related U.S. Application Data

(60) Provisional application No. 62/155,005, filed on Apr. 30, 2015.

(51) Int. Cl.
| | |
|---|---|
| *G06F 3/0484* | (2013.01) |
| *H04N 5/247* | (2006.01) |
| *G06K 9/46* | (2006.01) |
| *G06T 5/00* | (2006.01) |
| *G06T 7/292* | (2017.01) |

(52) U.S. Cl.
CPC ....... *G06F 3/04842* (2013.01); *G06K 9/4604* (2013.01); *G06T 5/001* (2013.01); *G06T 7/292* (2017.01); *H04N 5/247* (2013.01); *G06T 2207/10024* (2013.01); *G06T 2207/20104* (2013.01)

(58) Field of Classification Search
CPC .. G06F 3/04842; H04N 5/247; G06K 9/4604; G06T 5/001; G06T 2207/10024; G06T 2207/20104; G06T 7/292
See application file for complete search history.

(56) References Cited

U.S. PATENT DOCUMENTS

| | | | | |
|---|---|---|---|---|
| 2012/0169882 A1* | 7/2012 | Millar | ................... | H04N 7/181 348/159 |
| 2012/0254369 A1* | 10/2012 | Gillard | ............. | H04N 21/25891 709/219 |

(Continued)

OTHER PUBLICATIONS

European Search Report dated Nov. 16, 2016 for Appln. No. 16167827.1.

*Primary Examiner* — Dave Czekaj
*Assistant Examiner* — Berteau Joisil
(74) *Attorney, Agent, or Firm* — Pillsbury Winthrop Shaw Pittman LLP

(57) ABSTRACT

A system and method of selecting an area of interest from a plurality of images captured by a plurality of cameras are described. The method includes receiving a request for an area of interest from a plurality of images, the area of interest containing an object of interest selected by a user, the object of interest being captured in one or more images captured by one or more of the plurality of cameras, the plurality of cameras having overlapping field of views; determining a camera within the plurality of cameras that wholly contains the area of interest; transforming the physical location of the object of interest into a pixel position such that the area of interest being essentially centered around the pixel position corresponding to the physical location of the object of interest; and extracting the area of interest.

52 Claims, 41 Drawing Sheets

(56) References Cited

U.S. PATENT DOCUMENTS

| | | |
|---|---|---|
| 2014/0270684 A1 | 9/2014 | Jayaram et al. |
| 2015/0035951 A1 | 2/2015 | Jayaram et al. |
| 2015/0071497 A1* | 3/2015 | Kuusisto ................ G06Q 30/02 382/107 |
| 2015/0116502 A1* | 4/2015 | Um ........................ H04N 7/181 348/169 |
| 2016/0115998 A1 | 4/2016 | Jayaram et al. |

* cited by examiner $OP_i(X_i, Y_i, Z_i) \longrightarrow CP_i(X, Y)$

Image processing, image tracking, and ortho-rectification method.

FIG. 10

$W > D_W$ and $H > D_H$

Example: $W/2 \geq D_W$ and $H/2 \geq D_H$

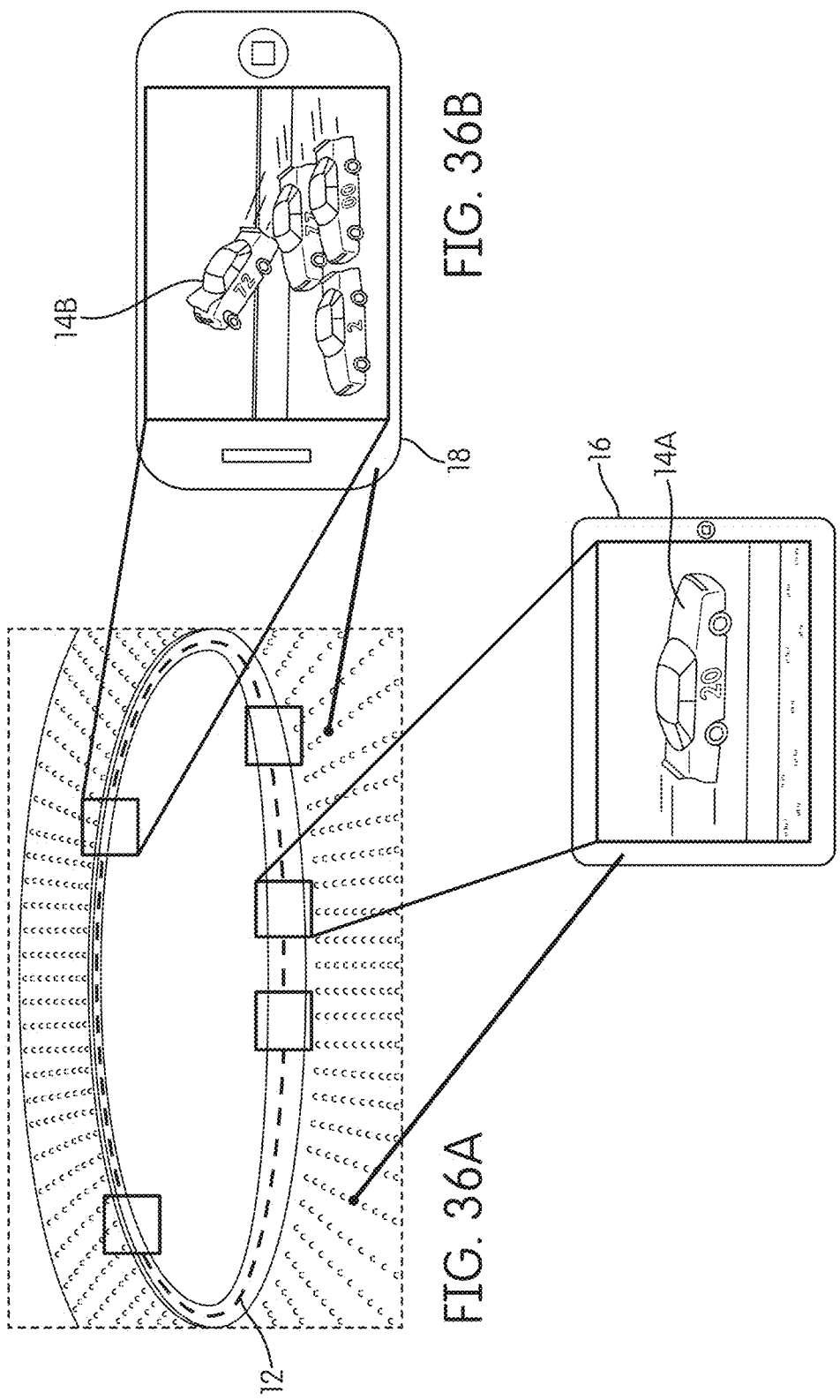

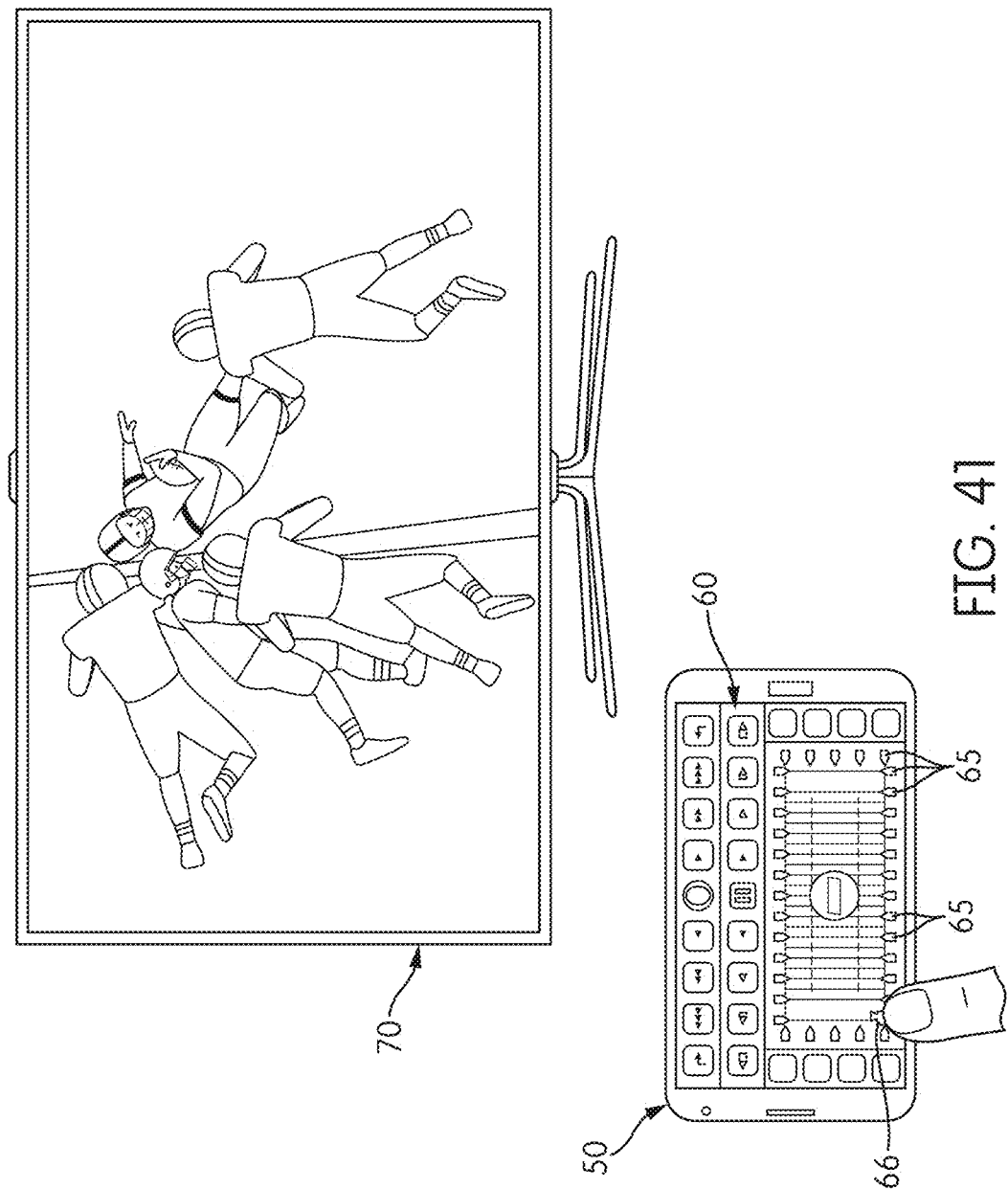

SYSTEMS AND METHODS OF SELECTING A VIEW FROM A PLURALITY OF CAMERAS

CROSS-REFERENCE TO RELATED APPLICATIONS

The present application claims priority benefit from Provisional Patent Application No. 62/155,005 files on Apr. 30, 2015, the entire content of which is incorporated herein by reference.

BACKGROUND OF THE INVENTION

Field of the Invention

The present invention pertains to image data management and in particular to a method and system of selecting a view or an area of interest (AOI) from a plurality of images captured by a plurality of cameras.

Discussion of Related Art

A relatively large image generally contains a plurality of pixels, e.g., millions of pixels. Each pixel has one, two or more bands. Each band has a certain color depth or bit depth. For example, an RGB color-based image has 3 bands, the red band (R), the green band (G) and the blue band (B). Each of the R, G and B bands can have a depth of 8 bits or more. Hence, in this example, each pixel can have a total bit depth of 24 bits or more.

A video or film camera captures a plurality of images or frames at a certain rate, i.e., a number of times per second (frames per second). Each captured image or frame, in a digital form, has a certain size defined by its pixel height and its pixel width. Pixel height corresponds to a number of rows of pixels in the image and pixel width corresponds to the number of columns in the image. Each image pixel has one or more bands. Each band can represent a quantized signal from a range of frequencies from the electromagnetic spectrum. For example, in the visible spectrum, the bands can represent different colors such as red, blue, and green (RGB).

An image sensor or camera can be used to capture a series of images or frames. Each image or frame in the series of images or frames can have thousands of pixels. Each image may have a relatively high resolution, such as 4K, 6K, 8K or more. As understood in the art, a 4K resolution refers to content or image(s) having horizontal resolution on the order of 4,000 pixels. Several 4K resolutions exist in the fields of digital television and digital cinematography. In the movie projection industry, DIGITAL CINEMA INITIATIVES (DCI) is the dominant 4K standard. A 4K resolution, as defined by DCI, is 4096 pixels×2160 pixels (approximately a 1.9:1 aspect ratio). An image of 4096 pixels by 2160 pixels has about 9 Megapixels (MP). As specified in standards for Ultra High Definition television, 4K resolution is also defined as 3840 pixels×2160 pixels (approximately a 1.78:1 aspect ratio). The following TABLE 1 provides examples of known standards for relatively high resolution images captured by industry standard camera sensors.

TABLE 1

| Format | Resolution (W pixels wide by H pixels tall or W × H) |
|---|---|
| Ultra high definition television (UHDTV) (Aspect Ratio is 1.78:1) | 3840 × 2160 |
| Ultra wide television (Aspect Ratio is 2.33:1) | 5120 × 2160 |
| WHXGA (Aspect Ratio is 1.6:1) | 5120 × 3200 |
| DCI 4K (native) (Aspect Ratio is 1.90:1) | 4096 × 2160 |
| DCI 4K (Cinemascope) (Aspect Ratio is 2.39:1) | 4096 × 1716 |
| DCI 4K (flat cropped) (Aspect Ratio is 1.85:1) | 3996 × 2160 |
| 8K-UHD (Aspect Ratio is 2.4:1) | 7680 × 3200 |

The images may be captured in sequence, for example at a reasonably constant frequency (e.g., 24 images or frames per second (fps), 48 fps, 60 fps, etc.). Each image (i.e., each still image or frame) in the sequence or series of images may have one or more distinct bands and may cover any part of the electromagnetic spectrum that can be captured by the image sensor or camera, including, the visible (VIS) spectrum, the infrared (IR) spectrum or the ultraviolet (UV) spectrum. The image sensor or camera may be a single sensor or a combination or a matrix of multiple smaller sensors or cameras that can be arranged to generate a larger image. Each smaller sensor or camera can be configured to capture a plurality of smaller images. The smaller images captured by the smaller sensors or cameras can then be combined (or stitched) to form a plurality of larger images.

In the media and entertainment industry, on network television, on cable television, on broadcast television, and on digitally distributed video content, some of the highest image pixel resolutions are known as 4K and 8K. For film, 4K is an image frame that is 4096 pixels wide by 2160 pixels tall. For ultra-high definition TV, 4K is an image frame that is 3840 pixels wide by 2160 pixels tall. In addition, 8K image frame sizes are also gaining ground. However, the most popular distribution formats are still 720P and 1080P which have image frame sizes of 1280 pixels wide by 720 pixels tall and 1920 pixels wide by 1080 pixels tall, respectively. Recently, 4K media playback devices have reached the mainstream market. These devices can also interpolate and display 1080P content.

Those skilled in the media and entertainment industry are aware of various existing and published standards in the industry. For example, in sport broadcasts, such as NASCAR®, NFL®, NHL®, NBA®, and FIFA®, with the advent of live and archive media streaming, the "second-screen" experience has gained popularity. For example, some sports venues have employed custom camera configurations that capture a video of a relatively high resolution that is larger than 1920 pixel wide and 1080 pixels tall. A video of image size 1920×1080 captured at 30 fps or 60 fps is also referred to as 1080P. For example, 3D-4U based in Seattle, Wash., USA, creates a very wide strip of video that is approximately 18000 pixels wide by 720 pixels tall or 1080 pixels tall. Using custom software and computers, they extract a smaller area of interest a size substantially smaller in pixel width and height than the captured strip content. This smaller area is optimized for display on a virtual reality environment or an APPLE iPad®.

However, none of the known image technologies or systems are able to provide or deliver a plurality of images or a video where an object in physical space captured in one or more images of the plurality of images can be mapped to pixels of the one or more images.

BRIEF SUMMARY OF THE INVENTION

An aspect of the present invention is to provide a method of selecting an area of interest from a plurality of images captured by a plurality of cameras, the method being implemented by a computer system that includes one or more processor units configured to execute computer program modules. The method includes receiving, by the one or more processor units, a request for an area of interest from a plurality of images, the area of interest containing an object of interest selected by a user, the object of interest being captured in one or more images captured by one or more of the plurality of cameras, the plurality of cameras having overlapping field of views such that images captured by the plurality of cameras have a plurality of overlapping regions, the request containing an identity of the object of interest; determining, by the one or more processor units, a camera within the plurality of cameras that wholly contains the area of interest using the physical location of the object of interest; transforming, by the one or more processor units, the physical location of the object of interest into a pixel position within an image of a specific camera within the plurality of cameras such that the area of interest being essentially centered around the pixel position corresponding to the physical location of the object of interest, and is wholly contained within the image captured by the specific camera; and extracting, by the one or more processor units, the area of interest substantially centered around the pixel position corresponding to the physical location of the object of interest.

Another aspect of the present invention is to provide a method of extracting an area of interest containing an object of interest from a plurality of images captured using a plurality of cameras, the method being implemented by a computer system that includes one or more processor units configured to execute computer program modules. The method includes determining, by the one or more processor units, using the data of the locator or the physical location of the object of interest, a camera within the plurality of cameras that wholly contains the area of interest, the area of interest containing the object of interest, the object of interest being captured in one or more images captured by one or more of the plurality of cameras, the plurality of cameras having overlapping field of views such that images captured by the plurality of cameras have a plurality of overlapping regions; transforming, by the one or more processor units, the physical location of the object of interest into a pixel position within an image of a specific camera within the plurality of cameras such that the area of interest is essentially centered around the pixel position corresponding to the physical location of the object of interest, and is wholly contained within the image captured by the specific camera; and extracting, by the one or more processor units, the area of interest substantially centered around the pixel position corresponding to the physical location of the object of interest.

A further aspect of the present invention is to provide a computer system for selecting an area of interest from a plurality of images captured by a plurality of cameras. The system includes one or more processor units configured to: receive a request for an area of interest from a plurality of images, the area of interest containing an object of interest selected by a user, the object of interest being captured in one or more images captured by one or more of the plurality of cameras, the plurality of cameras having overlapping field of views such that images captured by the plurality of cameras have a plurality of overlapping regions, the request containing an identity of the object of interest; determine a camera within the plurality of cameras that wholly contains the area of interest using the physical location of the object of interest; transform the physical location of the object of interest into a pixel position within an image of a specific camera within the plurality of cameras such that the area of interest being essentially centered around the pixel position corresponding to the physical location of the object of interest, and is wholly contained within the image captured by the specific camera; and extract the area of interest substantially centered around the pixel position corresponding to the physical location of the object of interest.

Various examples of implementations of the above methods and systems are provided in the following paragraphs including, but not limited to, implementation in a sports environment, gaming environment, law enforcement environment, etc.

Although the various steps of the method are described in the above paragraphs as occurring in a certain order, the present application is not bound by the order in which the various steps occur. In fact, in alternative embodiments, the various steps can be executed in an order different from the order described above or otherwise herein.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In an embodiment of the invention, the structural components illustrated herein are drawn to scale. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

In the accompanying drawings:

FIG. 10 depicts a conversion from the physical location of the object, within the field of view of the camera, being tracked or captured, to the pixel location of the object within an image captured by the camera at substantially the same instant in time, according to an embodiment of the present invention;

FIGS. 36A-36D depict an example of providing a video of an object of interest on-demand based on a selection of the object by a user, according to an embodiment of the present invention;

FIG. 41 depicts another configuration of the GUI that is displayed a display device (e.g., a smart device) of a user, according to an embodiment of the present invention.

DETAILED DESCRIPTION OF EMBODIMENTS OF THE INVENTION

Figure 1:
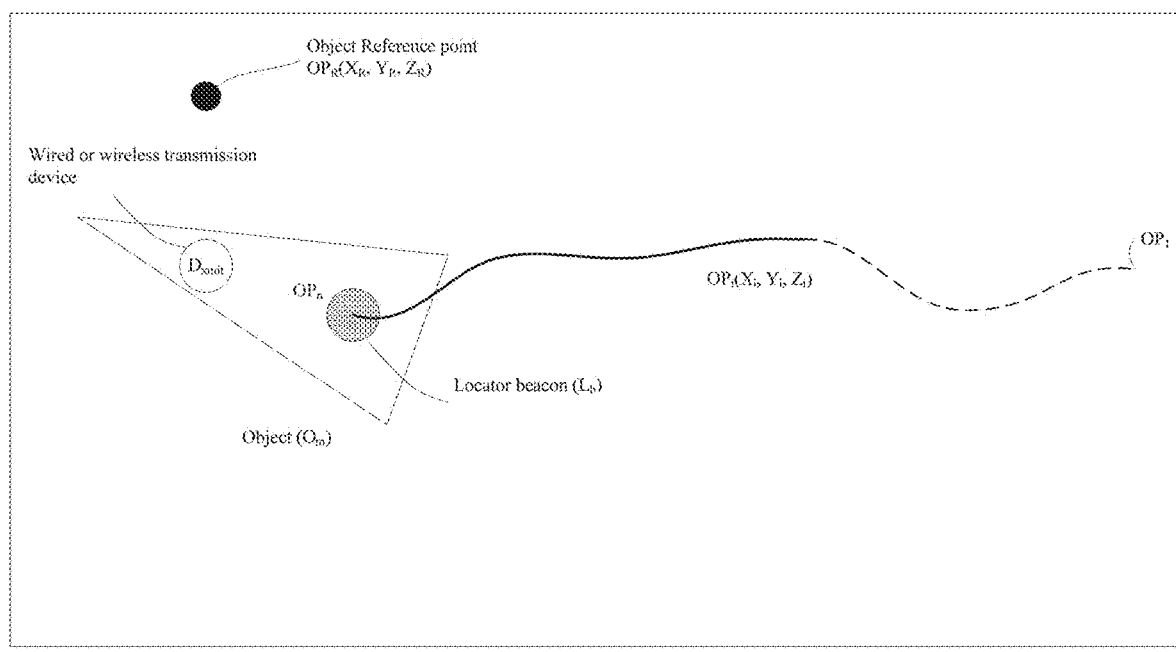
FIG. 1 depicts schematically a moving object being tracked by a tracking device attached to the object and a transmitter attached to the object transmitting tracking information, according to an embodiment of the present invention.

FIG. 1 depicts schematically a moving object being tracked by a tracking device attached to the object and a transmitter attached to the object transmitting tracking information, according to an embodiment of the present invention. As shown in FIG. 1, an object $O_m$ static or in movement (in motion) can be tracked using a tracking device or a locator beacon $L_b$. In an embodiment, a locator beacon $L_b$ is an electronic device that uses one or more sources of electromagnetic frequency. In another embodiment, locator beacon $L_b$ can be a detectable pattern or visual reference. An example of a locator beacon $L_b$ can be a Global Positioning System (GPS) unit, an Inertial Measurement Unit (IMU), a BLUETOOTH device, a laser, an optical sensor, an image pattern or visual reference (a discernable color), a marking, or any combination thereof. The locator beacon $L_b$ generates or helps generate or compute the absolute position $OP_i$ of object $O_m$ in three dimensions (3D) at a given instant in time $T_i$ across time T.

The physical location or position of object $O_m$ in 3D space can be written as $OP_i(Xi, Yi, Z_i)$. For example, $X_i$ can be longitude, $Y_i$ can be latitude, $Z_i$ can be elevation. A reference point $OP_R(X_R, Y_R, Z_R)$ can be provided for the location $OP_i$. The reference point $OP_R$ has coordinates $(X_R, Y_R, Z_R)$ in the 3D space. For example, a reference point for longitude, latitude and elevation can be (0, 0, sea-level). The locator beacon $L_b$ can generate or assist in the generation of a stream of 'n' position points $OP_i (X_i, Y_i, Z_i)$ over time T. Object $(O_m)$ can be static (immobile) or can be in motion. The object $O_m$ can be a shoe, a car, a projectile, a baseball, an American football, a soccer ball, a helmet, a horse, a ski or ski-boot, a skating shoe, etc. The object can be an aquatic, a land-based, or an airborne lifeform. The object can also be a manmade item that is tagged with the locator beacon. The Object $O_m$ may also be provided with a wired or wireless transmission device $D_{xmit}$. For example, the device $D_{xmit}$ can be configured to transmit a data stream from locator device $L_b$ to a receiver using some known protocol, e.g. HTTP, TCP or HTTPS.

Figure 2:
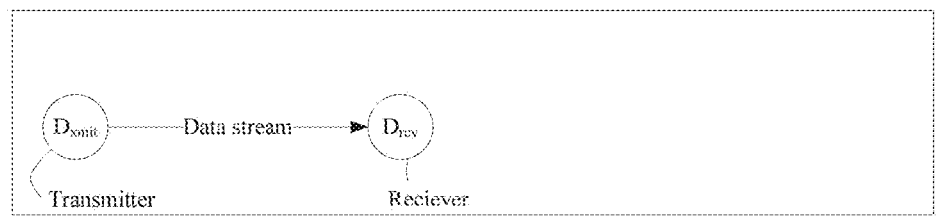
FIG. 2 depicts schematically the transmitter attached to the object transmitting the tracking information as a data stream to a receiver device, according to an embodiment of the present invention.

FIG. 2 depicts schematically the transmitter attached to the object transmitting the tracking information from locator device $L_b$ as a data stream to a receiver device, according to an embodiment of the present invention. As shown in FIG. 2, the data stream or collection of readings captured by locator beacon $L_b$ is transmitted by transmission device (transmitter) $D_{xmit}$ and received by receiver device (receiver) $D_{rev}$. The receiver device (receiver) $D_{rev}$ can be a wired device, a wireless device, or a cellular device.

Figure 3:
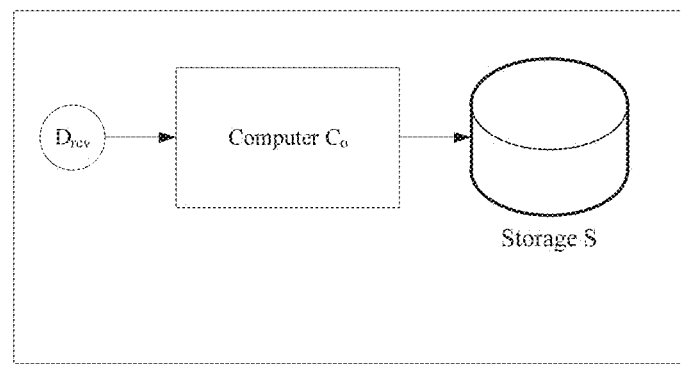
FIG. 3 depicts schematically the receiver device connected to a computer system that receives the data stream and stores it on a storage device, according to an embodiment of the present invention.

FIG. 3 depicts schematically the receiver device $D_{rev}$ connected to a computer system $C_o$ that receives the data stream and stores it on a storage device S, according to an embodiment of the present invention. As shown in FIG. 3, the receiver $D_{rev}$ sends the data to a computer system $C_o$ which in turn stores the received data on to a storage device S (e.g., a hard-drive, a network attached storage (NAS) device, a storage area network (SAN)). The data includes the data from locator device $L_b$, identifier of locator device $L_b$, metadata, the physical location or position of object $O_m$ in 3D space $OP_i(X_i, Y_i, Z_i)$, derived data, or any related data.

Figure 4:
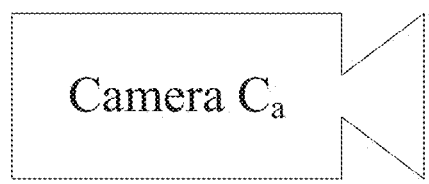
FIG. 4 depicts schematically a video camera, according to an embodiment of the present invention.
Figure 5:
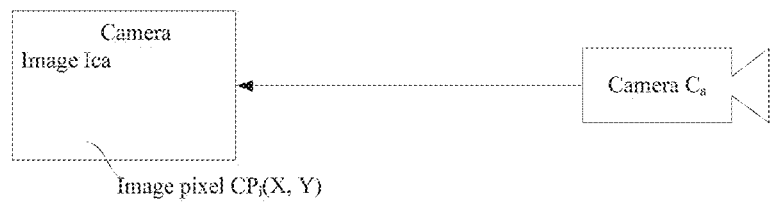
FIG. 5 depicts schematically the video camera collecting an image at an instant in time, according to an embodiment of the present invention.

FIG. 4 depicts schematically a video camera, according to an embodiment of the present invention. FIG. 5 depicts schematically the video camera collecting an image at an instant in time, according to an embodiment of the present invention. As shown in FIG. 5, the camera $C_a$ (e.g., a conventional video camera) depicted in FIG. 4 captures a plurality of temporally sequential images $I_{Ca}$. As further shown in FIG. 5, the camera image comprises a plurality of pixels $CP_i(X, Y)$, where i is an integer number referring to a specific pixel i and x and y referring to the position or coordinates of the pixel i. In an embodiment, the camera $C_a$ captures a video with relatively large image size such as, for example, a 4K or 8K, or greater.

Figure 6:
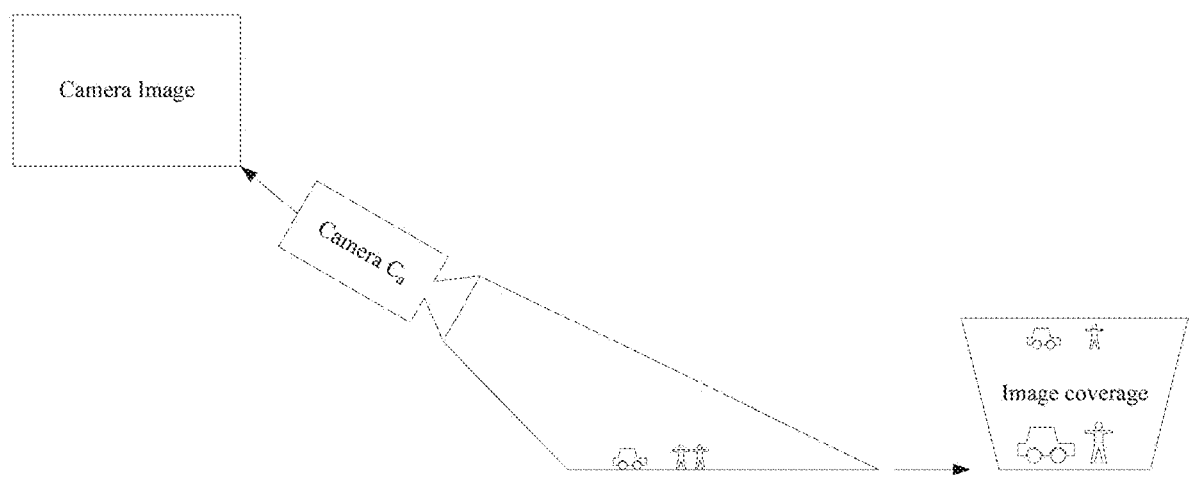
FIG. 6 depicts schematically the video camera collecting an image at an instant in time where the camera is static (fixed in position) and collecting the image at an incident angle, and the image having a perspective view of object(s) being captured in the image, according to an embodiment of the present invention.

FIG. 6 depicts schematically the video camera collecting an image at an instant in time where the camera is static (fixed in position) and collecting the image at an incident angle, and the image having a perspective view of object(s) being captured in the image, according to an embodiment of the present invention. As illustrated in FIG. 6, if camera $C_a$ is locked into a position such that it is at an angle, the resulting image coverage is trapezoidal where the objects closer to the camera appear larger and those farther from the camera appear smaller.

Figure 7:
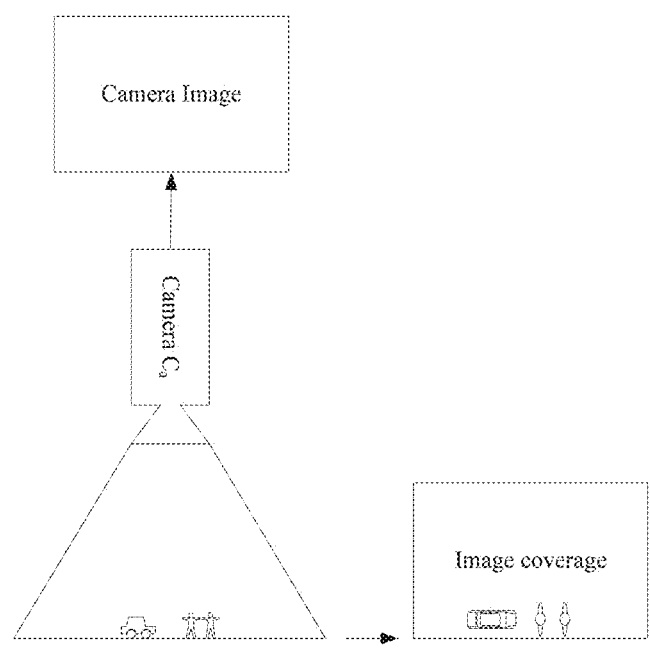
FIG. 7 depicts schematically the video camera collecting an image at an instant in time where the camera is static and collecting the image looking down on the object(s), and the image is a top-view of the field of view, according to an embodiment of the present invention.

FIG. 7 depicts schematically the video camera collecting an image at an instant in time. The camera is static and collects the image looking down on the object(s), and the image is a top-view of the field of view, according to an embodiment of the present invention. In FIG. 7, the position of the camera is looking down from an elevated position onto a field of view containing objects.

Figure 8:
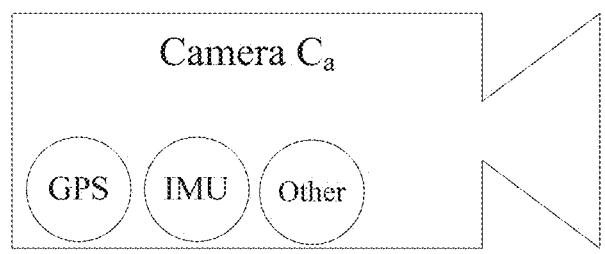
FIG. 8 depicts schematically the video camera having sensors that provide a position of the camera, for example, GPS sensor, IMU sensor and/or any other type of sensors such as visual sensor, according to an embodiment of the present invention.

FIG. 8 depicts schematically the video camera having sensors that provide a position of the camera, for example, a GPS sensor, an IMU sensor and/or any other type of sensors such as visual sensor, according to an embodiment of the present invention. As shown in FIG. 8, camera $C_a$ can also be equipped with an optional GPS, IMU or other positioning sensors. In an embodiment, the orientation, pan, tilt and zoom values of camera $C_a$ remain constant. In this case, the absolute position of the camera can be used to link the position of each pixel in the image captured by the camera to the physical space or field of view being captured by the camera $C_a$.

Figure 9:
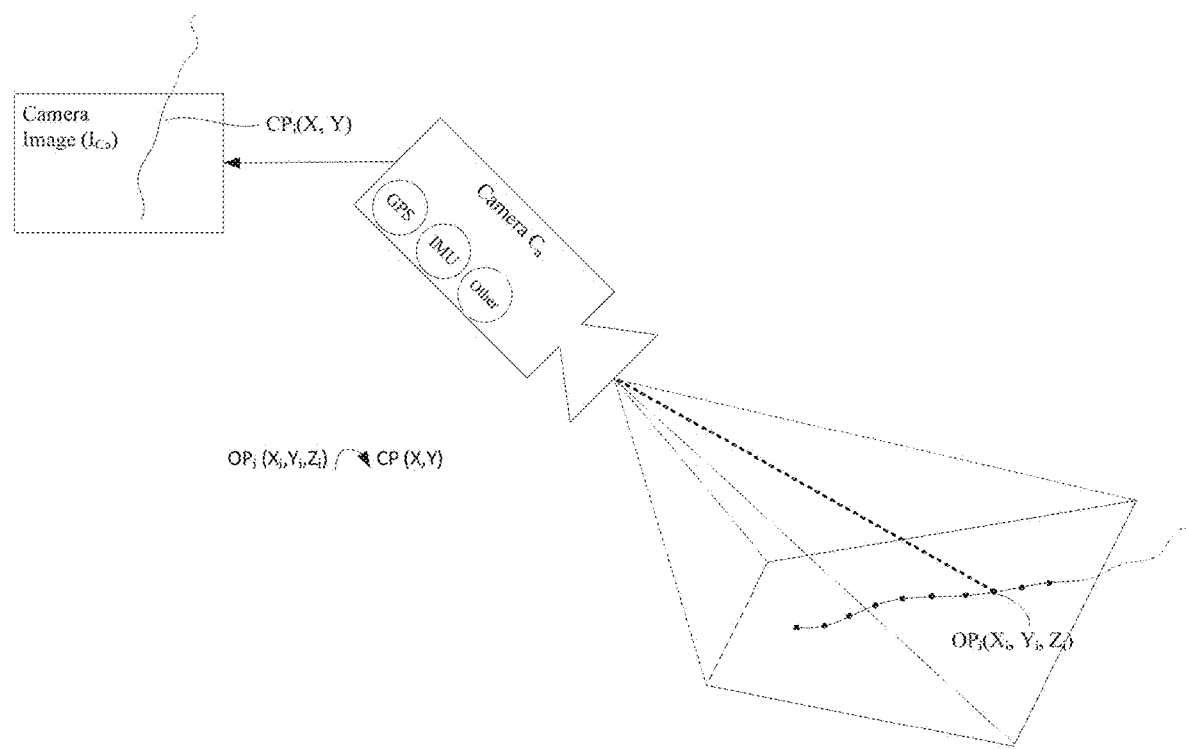
FIG. 9 depicts schematically an object being tracked and captured in an image at a location at an instant in time, in the field of view of the camera with a known location and orientation, the pixel position of the object in the image at that instant in time can be computed from the physical location of the object, according to an embodiment of the present invention.

FIG. 9 depicts schematically an object being tracked and captured in an image at a location at an instant in time, in the field of view of the camera $C_a$ with a known location and orientation, the pixel position of the object in the image at that instant in time can be computed from the physical location of the object, according to an embodiment of the present invention. As shown in FIG. 9, if the location and orientation of the camera is known, a tracked point $OP_i(X_i, Y_i, Z_i)$ in 3D space at time $T_i$, that falls within the field of view of the camera $C_a$ has a corresponding projected point $CP_i(X, Y)$ within an image captured by the camera $C_a$ at about the same time, $OP_i(X_i, Y_i, Z_i) \rightarrow CP_i(X, Y)$.

FIG. 10 depicts a conversion from the physical location of the object, within the field of view of the camera, being tracked or captured, to the pixel location of the object within an image captured by the camera at substantially the same instant in time, according to an embodiment of the present invention. As shown in FIG. 10, image processing, image tracking, and other image-rectification methods (such as ortho-rectification) can be used to accurately convert from the physical position $OP_i$ of object $O_m$ at any time $T_i$ to an absolute pixel location $CP_i(X, Y)$, such that $OP_i(X_i, Y_i, Z_i) \rightarrow CP_i(X, Y)$, within a frame of video that is captured at time where, $T_i=T_j$ or $T_i \approx T_j$. It is assumed that physical position $OP_i(X_i, Y_i, Z_i)$ is within the field of view of camera $C_a$. The computation for image distortion and subsequent orthographic adjustment can also be performed if desired by the user. This data is computed by computer $C_o$ and stored on storage S. In an embodiment, conventional processing and image tracking methods can be used to accomplish this conversion.

Figure 11:
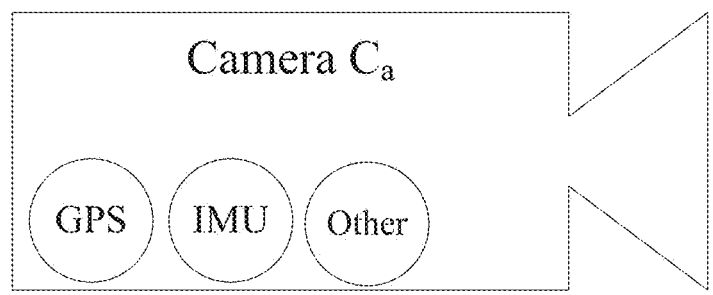
FIG. 11 depicts schematically a video camera with various sensors that determine the position of the camera including, a GPS sensor, an IMU sensor or other types of sensors, according to an embodiment of the present invention.

FIG. 11 depicts schematically a video camera with sensors that determine the position of the camera such as, a GPS sensor, an IMU sensor or other types of sensors, according to an embodiment of the present invention. FIG. 11 depicts a camera $C_a$ that may be identical to the one shown in FIG. 8.

Figure 12:
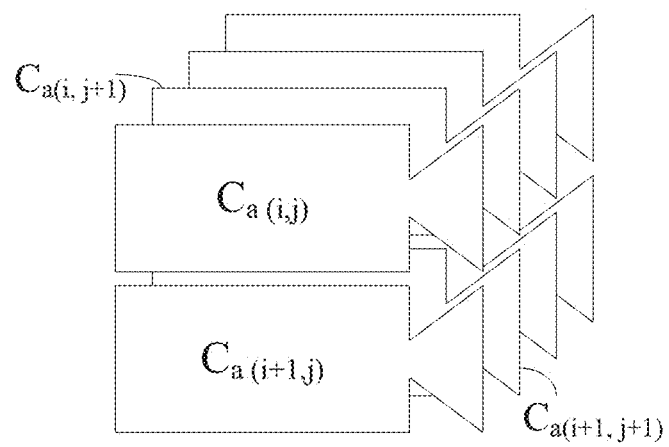
FIG. 12 depicts schematically a video camera arranged in a matrix of a plurality of cameras such that the field of view of one camera substantially overlaps the field of view of an adjacent camera by a known amount, according to an embodiment of the present invention.

FIG. 12 depicts schematically a matrix of a plurality of cameras such that the field of view of one camera substantially overlaps the field of view of an adjacent camera by a known amount, according to an embodiment of the present invention. An array of such cameras can be arranged in a matrix configuration comprising of rows 1 to r and columns 1 to c where $C_{a(i,j)}$ is one camera in the matrix. Hence, cameras $C_{a(i+1,j)}$ and $Ca_{(i,j+1)}$, are adjacent cameras to $C_{a(i,j)}$. The indices i and j represent the row and column numbers in the matrix of cameras, respectively. In an embodiment, the cameras can be mounted in such a way that the field of view of one camera $C_{a(i,j)}$ overlaps (has at least some overlap) with the field of view of an adjacent camera. The quantity of overlap can be configured and selected as needed. For example, the cameras can have an overlap such that at least 50% of the pixels in the horizontal direction for one camera are substantially identical to at least 50% of the pixels in the horizontal direction for an adjacent camera to the left or right of the one camera. In another example, the cameras can have an overlap such that at least 50% of the pixels in the vertical direction for one camera are substantially identical to at least 50% of the pixels in the vertical direction for an adjacent camera to the top or bottom of the one camera.

Figure 13:
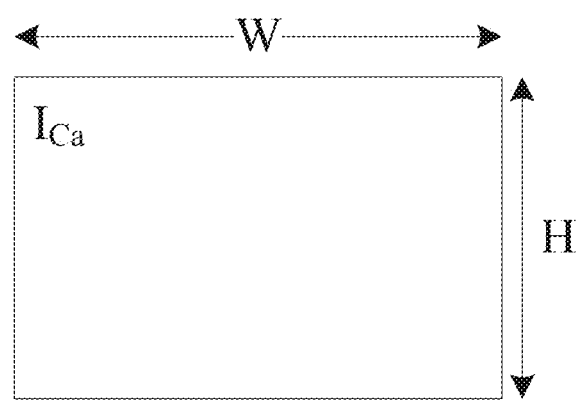
FIG. 13 depicts an image $I_{Ca}$ captured by the camera, the image having a pixel width W and a pixel height H, according to an embodiment of the present invention.

FIG. 13 depicts an image $I_{Ca}$ captured by one camera in the matrix of cameras, the image having a pixel width W and a pixel height H, according to an embodiment of the present invention. As shown in FIG. 13, the image $I_{Ca}$ as captured by such camera $C_a$ has pixel width W and pixel height H. The pixel width W and pixel height H of the image captured by the camera can be selected as desired by the user, for example, using one of the settings of the camera.

Figure 14:
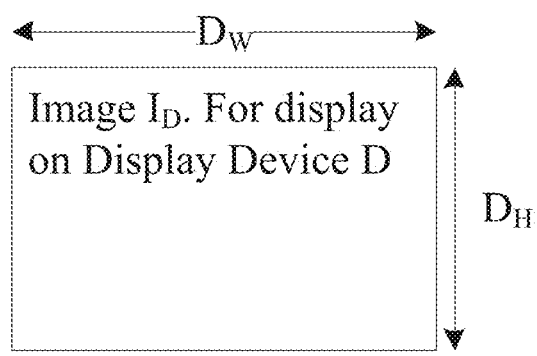
FIG. 14 depicts an image $I_D$ selected for display on a display device D, where the pixel width of image $I_D$ is $D_W$ pixels and the pixel height of image $I_D$ is $D_H$ pixels, where $I_D$ is a portion of image $I_{Ca}$ captured by the camera such that pixel width W>$D_W$ and pixel height H>$D_H$, according to an embodiment of the present invention.

FIG. 14 depicts an image $I_D$ selected for display on a display device D, where the pixel width of displayed image $I_D$ is $D_W$ pixels and the pixel height of image $I_D$ is $D_H$ pixels, according to an embodiment of the present invention. The displayed image $I_D$ is a portion of captured image $I_{Ca}$ captured by the camera such that pixel width W of captured image $I_{ca}$ is greater than the pixel width $D_W$ of displayed image $I_D$ ($W>D_W$) and pixel height H of captured image $I_{ca}$ is greater than pixel height $D_H$ of displayed image $I_D$ ($H>D_H$). Although, the term "displayed" is used in this example to indicate an image displayed on a display device such as a computer screen, as it must be appreciated that the term "displayed image" can also encompass an image that is transformed or transmitted or otherwise processed and is not limited to only displaying the image on a display device.

Figure 15:
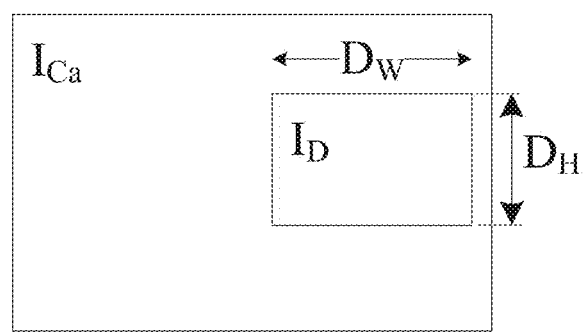
FIG. 15 depicts schematically an example of image $I_D$ and image $I_{Ca}$ such that W/2>$D_W$ and H/2>$D_H$, that is the pixel width and pixel height of the displayed area of interest from the camera image is at least half the pixel width and pixel height of the image captured by the camera, according to an embodiment of the present invention.

FIG. 15 depicts schematically an example of image $I_D$ and image $I_{Ca}$ such that $W/2 \geq D_W$ and $H/2 \geq D_H$. In other words, the pixel width and pixel height of the displayed area of interest from the camera image is at least half the pixel width and pixel height of the image captured by the camera, according to an embodiment of the present invention. As shown in FIG. 15, the image $I_D$ is a sub-image of $I_{Ca}$ where $I_D$ is an area of interest within $I_{Ca}$. For example, if W is 3840, H is 2160, then $D_W$ is 1920 or smaller and $D_H$ is 1080 or smaller. Note that a display device D does not need to be a computer monitor or computer screen. It can be a window on a screen of a computer running the Microsoft WINDOWS operating system or Apple Mac OS-X operating system. This window may display an image of any pixel width and height. For example, display D can be a window that has the following dimensions, $D_W$ is 960 pixels and $D_H$ is 540 pixels.

In an embodiment, when using a matrix of cameras as shown in FIG. 12, the cameras are synchronized with each other. A first camera covers a first field of view and a second camera adjacent to the first camera covers a second field of view to the left or to the right of the first field of view. The first and second cameras are temporally synchronized, for example by using a 'genlock' signal. This implies that the first camera captures a first image at a first instant in time, and the second camera captures a second image at a second instant in time and the first instant in time and the second instant in time are substantially the same.

Figure 16:
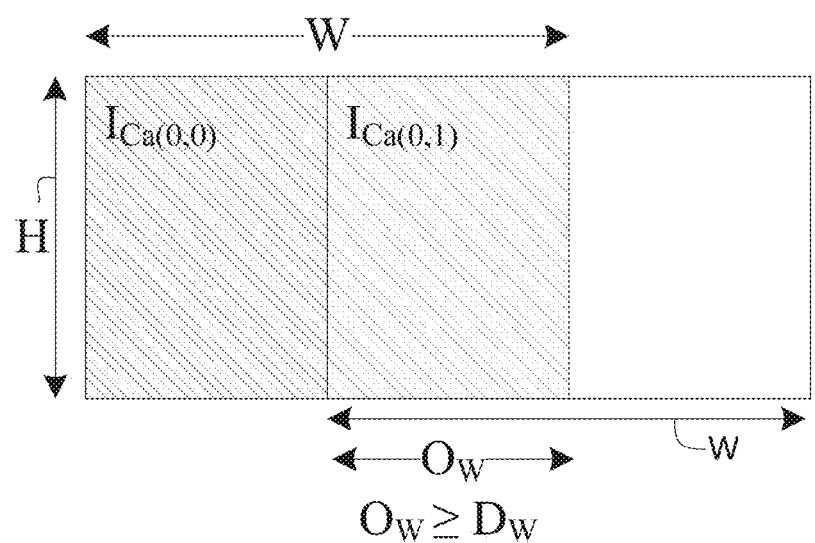
FIG. 16 depicts schematically an example of two adjacent cameras, each camera generating an image of pixel width W and pixel height H, with a horizontal overlap of $O_W$ pixels where $O_W \geq D_W$, according to an embodiment of the present invention.

FIG. 16 depicts schematically an example of images captured by two adjacent cameras (e.g., the first camera and the second camera), each camera generating an image of pixel width W and pixel height H, with a horizontal overlap between the images of $O_W$ pixels where $O_W \geq D_W$, according to an embodiment of the present invention. In other words, the first image captured by the first camera and the second image captured by the second camera overlap with a certain amount overlap $O_W$. In an embodiment, as shown in FIG. 16, the first image has pixels in the horizontal direction, along the width of the first image that are substantially identical to the pixels in the horizontal direction, along the width of the second image. This is referred to as a pixel overlap or image overlap or overlapping image. The overlap is $O_W$ pixels wide. In an embodiment, the overlap $O_W$ is greater than or equal to the width $D_W$ of the display device or window shown displayed on the display device (i.e., $O_W \geq D_W$).

Figure 17:
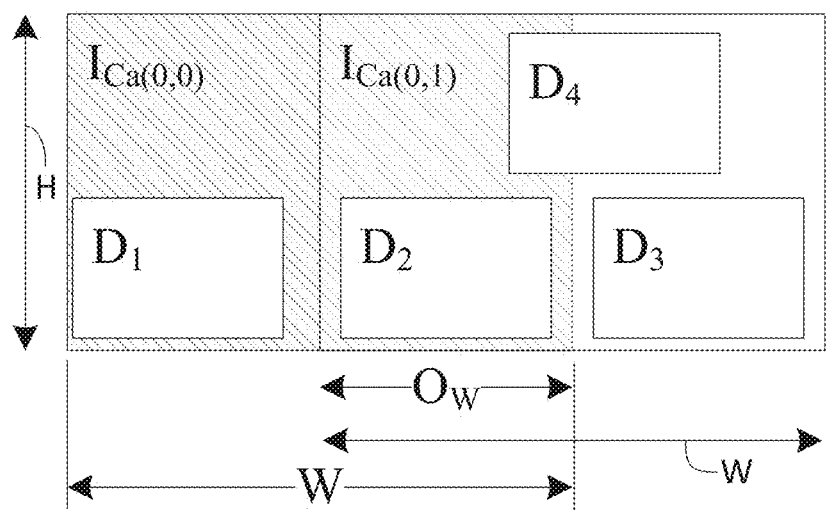
FIG. 17 depicts schematically an example of two adjacent cameras, each camera generating an image of pixel width W and pixel height H, with a horizontal overlap of $O_W$ pixels where $O_W \geq D_W$, and four examples of an area of interest $D_1$, $D_2$, $D_3$ and $D_4$ such that each area of interest is wholly contained within the image captured by at least one camera, as a result of the overlap, according to an embodiment of the present invention.

FIG. 17 depicts schematically an example of two images generated by two adjacent cameras, each camera generating an image of pixel width W and pixel height H, with a horizontal overlap between the two images of $O_W$ pixels where $O_W \geq D_W$, according to an embodiment of the present invention. FIG. 17 further depicts four examples of an area of interest $D_1$, $D_2$, $D_3$ and $D_4$ such that each area of interest is wholly contained within the image captured by at least one camera, as a result of the overlap, according to an embodiment of the present invention. As shown in FIG. 17, if the areas of interest D1, D2, D3 or D4 is such that $O_W \geq D_W$, then the area of interest D1, D2, D3 or D4 is wholly contained within at least the image $I_{Ca}$ of one camera. As shown in FIG. 17, area of interest (AOI) D1 is contained within a first half of the first image $I_{Ca(0,0)}$, AOI D2 is contained in both the second half of the first image as well as first half of the second image in the overlap area $O_W$, $I_{Ca(0,0)}$ and $I_{Ca(0,1)}$, AOI D3 is contained within the second half of the second image, $I_{Ca(0,1)}$. A portion of AOI D4 is contained within the second half of the second image and another portion of AOI D4 is contained within the first half of the second image and the second half of the first image, in the overlap area $O_W$.

In a similar fashion, a first camera may cover a first field of view and a second camera may cover a second field of view above or below the first field of view of the first camera. The first and second cameras are temporally synchronized, for example by using a 'genlock' signal. This implies that the first camera captures a first image at a first instant in time, and the second camera captures a second image at a second instant in time and the first instant in time and the second instant in time are substantially the same.

Figure 18:
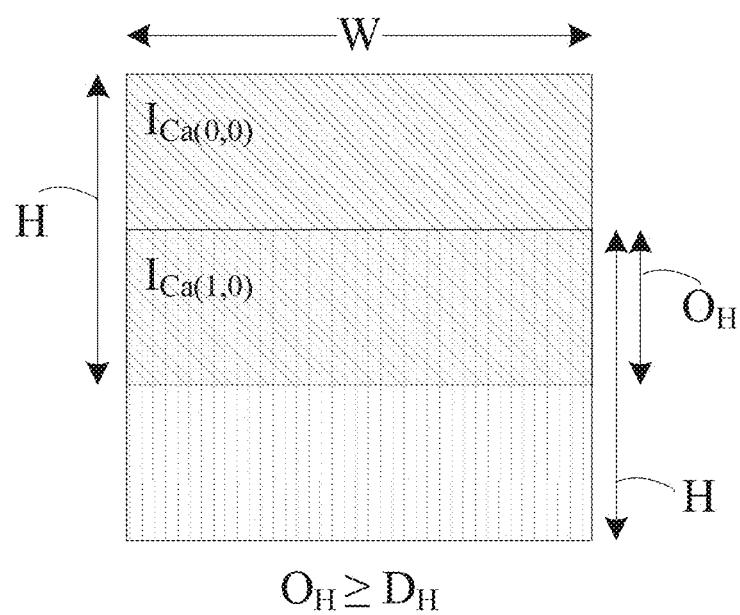
FIG. 18 depicts schematically an example of two adjacent cameras, each generating an image of pixel width W and pixel height H, with a vertical overlap of $O_H$ pixels where $O_H \geq D_H$, according to an embodiment of the present invention.

FIG. 18 depicts schematically an example of two images from two adjacent cameras (e.g., the first camera and the second camera), each camera generating an image of pixel width W and pixel height H, with a vertical overlap of $O_H$ pixels where $O_H \geq D_H$, according to an embodiment of the present invention. In other words, a first image captured by the first camera and a second image captured by the second camera overlap with a certain amount $O_H$. In an embodiment, as shown in FIG. 18, the first image has pixels in the vertical direction, along the height of the first image that are substantially identical to the pixels in the vertical direction, along the height of the second image. This is referred to as a pixel overlap or image overlap or overlapping image. The overlap is $O_H$ pixels wide. In an embodiment, the overlap $O_H$ is greater than or equal to the height $D_H$ of the display device or window ($O_H \geq D_H$).

Figure 19:
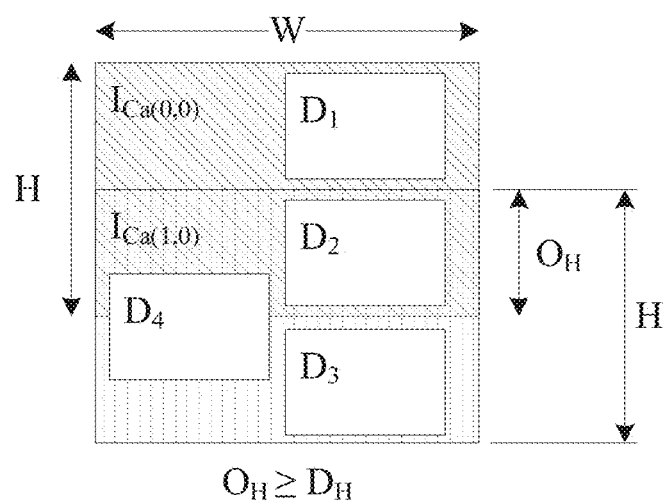
FIG. 19 depicts an example of two adjacent cameras, each generating an image of pixel width W and pixel height H, with a vertical overlap of $O_H$ pixels where $O_H \geq D_H$, and depicts 4 examples of an areas of interest $D_1$, $D_2$, $D_3$ and $D_4$ such that each area of interest is wholly contained within the image captured by at least one camera, as a result of the overlap, according to an embodiment of the present invention.

FIG. 19 depicts an example of two adjacent first and second images from first and second cameras, each generating an image of pixel width W and pixel height H, with a vertical overlap of $O_H$ pixels where $O_H \geq D_H$, and depicts 4 examples of an areas of interest $D_1$, $D_2$, $D_3$ and $D_4$ such that each area of interest is wholly contained within the image captured by at least one camera, as a result of the overlap, according to an embodiment of the present invention. As shown in FIG. 19, if the area of interest D1, D2, D3 or D4 is such that $O_H \geq D_H$, then the area of interest D1, D2, D3 or D4 is wholly contained within at least the image $I_{Ca}$ of one camera. As shown in FIG. 19, area of interest (AOI) D1 is contained within a first half of the first image $I_{Ca(0,0)}$, AOI D2 is contained in both the second half of the first image as well as first half of the second image in the overlap area $O_H$, $I_{Ca(0,0)}$ and $I_{Ca(1,0)}$, AOI D3 is contained within the second half of the second image, $I_{Ca(1,0)}$. A portion of AOI D4 is contained within the second half of the second image and another portion of AOI D4 is contained within the first half of the second image and the second half of the first image, in the overlap area $O_H$.

Figure 20:
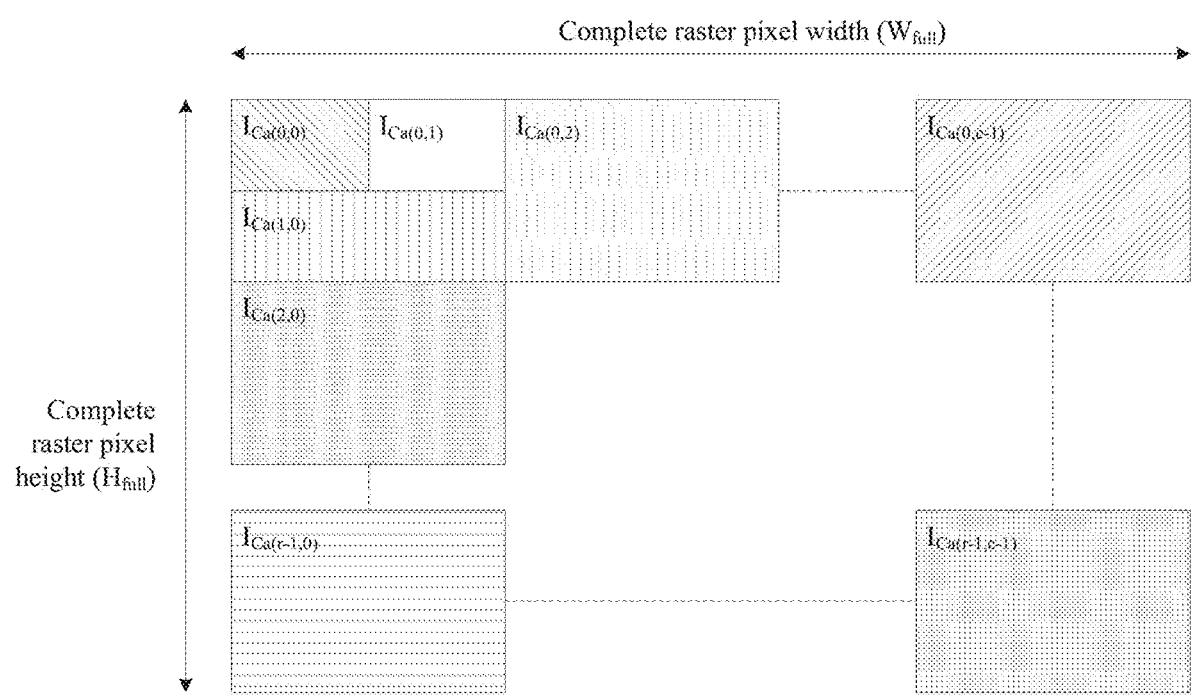
FIG. 20 depicts schematically images generated by a matrix of a plurality of cameras where the cameras are configured such that the pixel data in one image generated by one camera is substantially identical to the pixel data of one image generated by an adjacent camera due to overlapping fields of view of one camera with the adjacent camera, according to an embodiment of the present invention.

FIG. 20 depicts schematically images generated by a matrix of a plurality of cameras where the cameras are configured such that the pixel data in one image generated by one camera is substantially identical to the pixel data of one image generated by an adjacent camera due to overlapping fields of view of one camera with the adjacent camera, according to an embodiment of the present invention. FIG. 20 depicts the matrix of cameras of r-rows and c-columns, arranged to be adjacent to each other with overlapping fields of view, such that the images generated by one camera overlaps with the images generated by an adjacent camera in the horizontal plane and/or in the vertical plane. The images generated by the plurality of adjacent cameras (or matrix of cameras) form a larger aggregated image having a width $W_{full}$ and a height $H_{full}$. The notional aggregated image is simply logical in nature as it is not physically generated by stitching images from each camera together to form a larger image. The row and column values or indices in the matrix of images from the plurality of cameras can be used for further computation.

Figure 21:
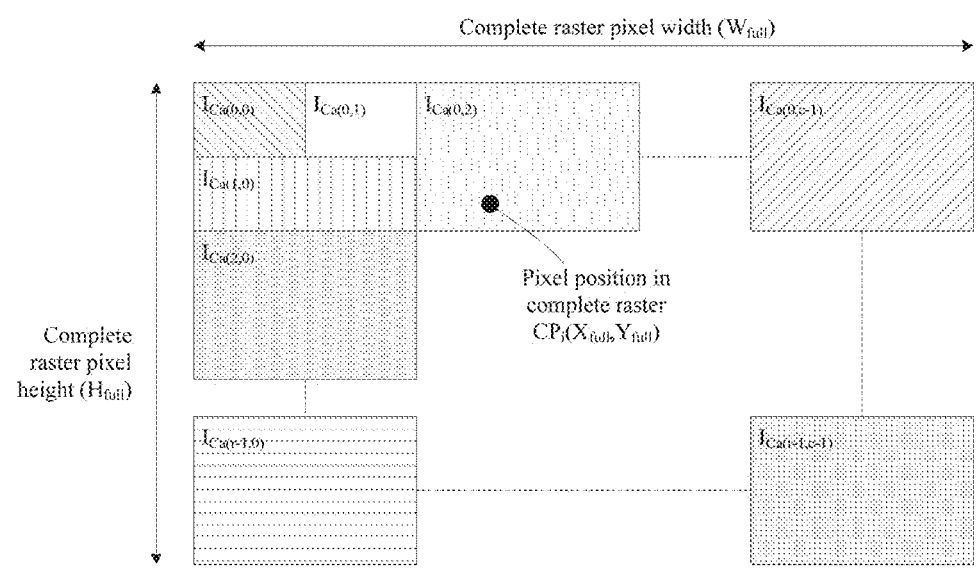
FIG. 21 depicts schematically a pixel in an aggregated image generated from the matrix of cameras mathematically maps to a pixel within one of the constituent images from one or more of the cameras, according to an embodiment of the present invention.

FIG. 21 depicts schematically a pixel in an aggregated image generated from the matrix of cameras mathematically maps to a pixel within one of the constituent images from one or more of the cameras, according to an embodiment of the present invention. As illustrated in FIG. 21, pixel $CP_i$ $(X_{full}, Y_{full})$ in the resulting notional aggregated image maps to an actual pixel $CP_i(X, Y)$ which belongs to an image within a specific camera. The position of this pixel can be derived mathematically.

Figure 22:
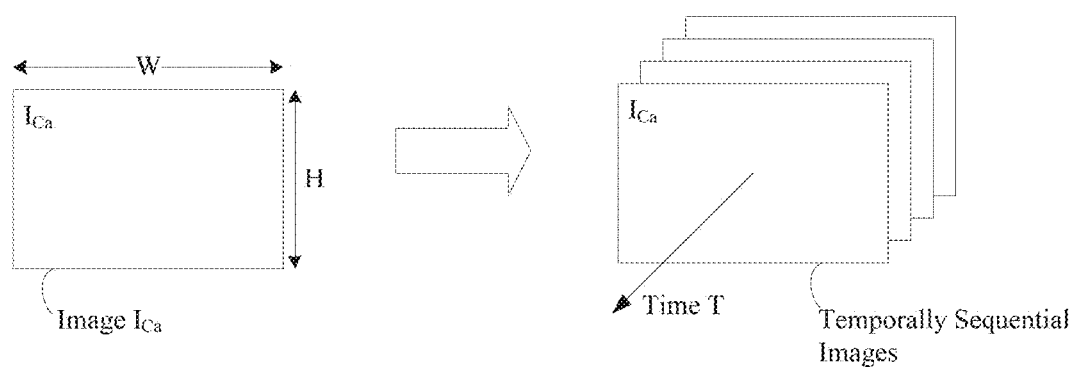
FIG. 22 depicts schematically one image captured at one instant in time by a camera, resulting in the capture of a plurality of temporally sequential images captured over time at a known frame rate, according to an embodiment of the present invention.

FIG. 22 depicts schematically one image captured at one instant in time by a camera, resulting in the capture of a plurality of temporally sequential images captured over time at a known frame rate, according to an embodiment of the present invention. A single image $I_{Ca}$ is captured by a camera at a given instant in time T. The plurality of temporally sequential images are captured by one camera at a known frame rate Hz (frame/second). If all cameras are synchronized, all cameras generate such data at substantially the same rate Hz and substantially same instants in time.

Figure 23:
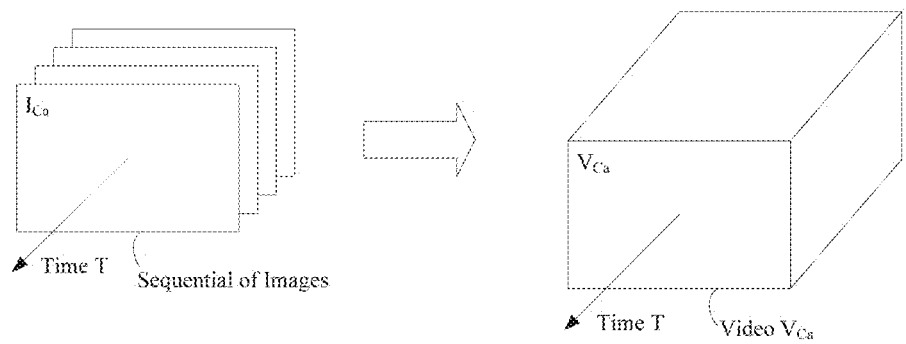
FIG. 23 depicts a conversion of a plurality of temporally sequential images $I_{Ca}$ captured by the camera into a video stream $V_{Ca}$ in a known format and encoding, according to an embodiment of the present invention.

FIG. 23 depicts a conversion of a plurality of temporally sequential images $I_{Ca}$ captured by one camera into a video stream $V_{Ca}$ in a known format and encoding, according to an embodiment of the present invention. As shown in FIG. 23, each image $I_{Ca}$ captured by one camera $C_a$ can be encoded inside or outside the camera into a video stream $V_{Ca}$. Therefore, video stream $V_{Ca}$ can be delivered from the camera at a known frame rate (Hz) and in a known compressed or uncompressed format. As illustrated in FIG. 23, the sequence of images, each image being $I_{Ca}$, is converted to video stream $V_{Ca}$. The video stream $V_{Ca}$ can be stored in primary or secondary computer memory or stored in a storage device for further processing or transmission. The video stream $V_{Ca}$ can, for example, be displayed on a display device.

Figure 24:
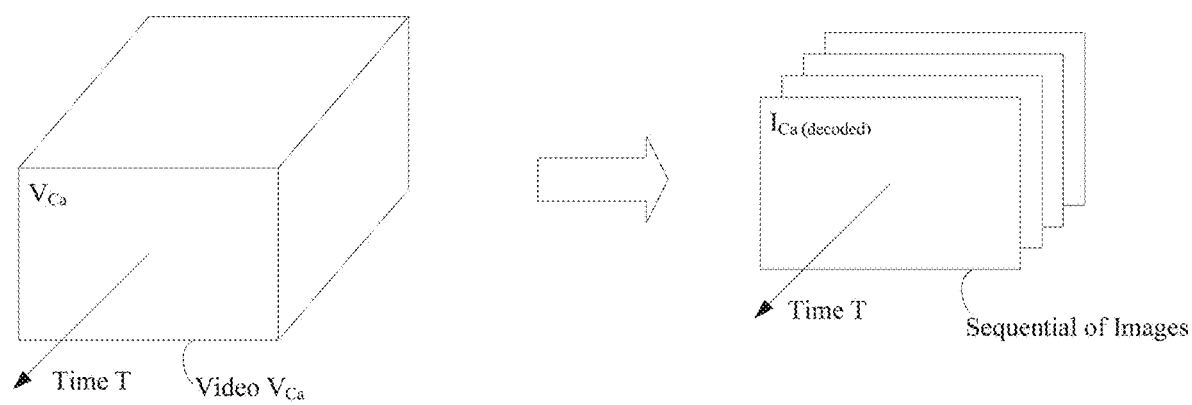
FIG. 24 depicts schematically a video stream $V_{Ca}$ in a known format and encoding being decoded into a plurality of temporally sequential images $I_{Ca(decoded)}$ that are substantially identical to the images originally captured by the camera and converted into the video stream $V_{Ca}$, according to an embodiment of the present invention.

FIG. 24 depicts schematically a video stream $V_{Ca}$ in a known format and encoding being decoded into a plurality of temporally sequential images $I_{Ca(decoded)}$ that are substantially identical to the images originally captured by the camera and converted into the video stream $V_{Ca}$, according to an embodiment of the present invention. As shown in FIG. 24, video $V_{Ca}$ can be decoded by another device into a plurality of temporally sequential images, each image $I_{Ca(decoded)}$ being substantially similar to the corresponding original image $I_{Ca}$ used to create $V_{Ca}$. Video $V_{Ca}$ is delivered from a camera at a known delivery or capture frame rate (in Hz) and in a known compressed or uncompressed format. The sequence of images in the Video are decoded from the video at a known decoding frame rate. The decoding frame rate can be the same or different from the delivery or capture rate of the video.

Figure 25:
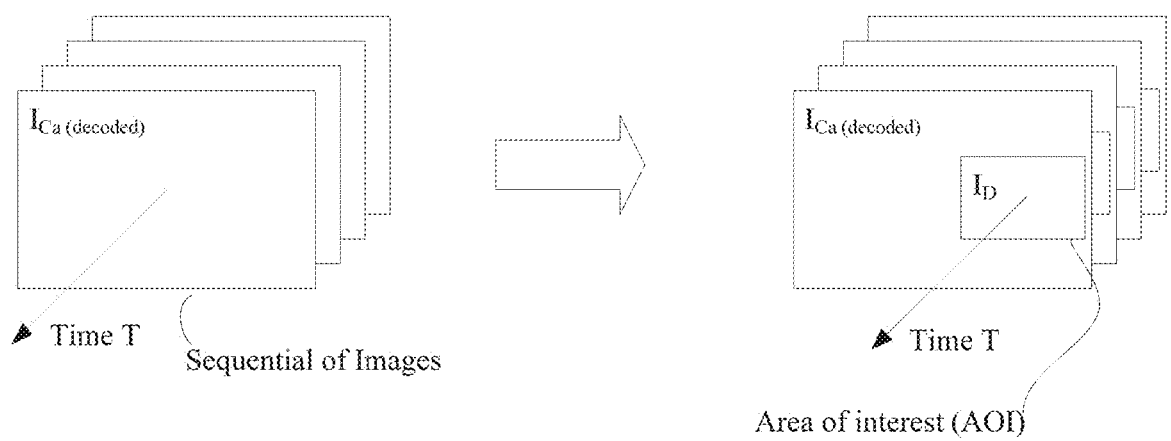
FIG. 25 depicts schematically a desired area of interest or desired region D extracted from a plurality of decoded temporally sequential images $I_{Ca(decoded)}$ captured over time T, according to an embodiment of the present invention.

FIG. 25 depicts schematically a desired area of interest or desired region D extracted from a plurality of decoded temporally sequential images $I_{Ca(decoded)}$ captured over time T, according to an embodiment of the present invention. FIG. 25 depicts that a desired area of interest $I_D$ can be extracted from an image $I_{Ca(decoded)}$. A plurality of areas of interest similar to $I_D$ can be extracted from a plurality of images similar to $I_{Ca(decoded)}$.

Figure 26:
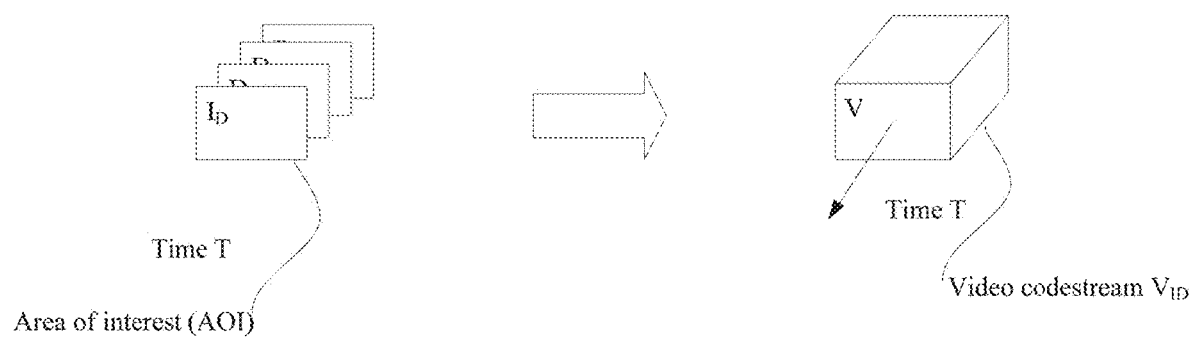
FIG. 26 depicts schematically a plurality of images representing the desired area of interest or desired region D extracted from a plurality of decoded temporally sequential images $I_{Ca(decoded)}$ captured over time T being converted into a video codestream $V_{ID}$ of a known format and encoding, according to an embodiment of the present invention.

FIG. 26 depicts schematically a plurality of images representing the desired area of interest or desired region D extracted from a plurality of decoded temporally sequential images $I_{Ca(decoded)}$ captured over time T being converted into a video codestream $V_{ID}$ of a known format and encoding, according to an embodiment of the present invention. The extracted plurality of areas of interest images, each image being an area of interest image $I_D$ from $I_{Ca(decoded)}$, can then be encoded to a video codestream $V_{ID}$ of known format.

Figure 27:
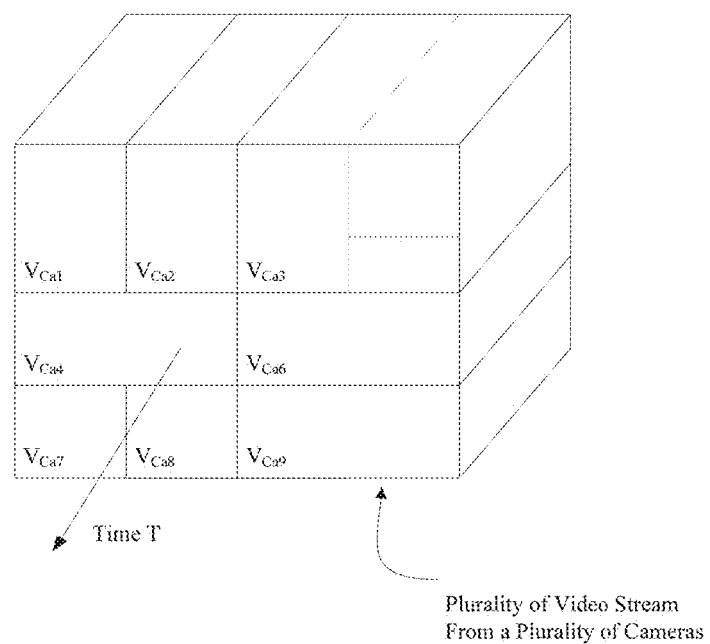
FIG. 27 depicts schematically a plurality of cameras arranged in a matrix such that the field of view of one camera substantially overlaps the field of view of an adjacent camera, and each camera generates a video containing some pixels in the video from one camera that are substantially identical to some pixels in the video from an adjacent camera because of overlapping fields of view, according to an embodiment of the present invention.

FIG. 27 depicts schematically a plurality of cameras arranged in a matrix configuration such that the field of view of one camera has at least some overlap with the field of view of an adjacent camera, and each camera generates a video containing some pixels in the video from one camera that are substantially identical to some pixels in the video from an adjacent camera because of overlapping fields of view, according to an embodiment of the present invention. For example, in an embodiment, the plurality of cameras can be configured to overlap by a width of $O_W$ pixels and a height of $O_H$ pixels, where, for example, $O_W$ is at least W/2 (i.e., greater than or equal to half the width W of an image captured by one camera) and $O_H$ is at least H/2 (i.e., greater than or equal to half the height H of an image captured by one camera). The plurality of cameras can be synchronized with each other such that the instant in time when an image is captured by one camera is substantially the same as the instant in time when an image is captured by all other cameras. The cameras can also be color calibrated to substantially match each other's color space. In an embodiment, all cameras are configured to generate video streams, depicted as $V_{Ca1}$, $V_{Ca2}$, $V_{Ca3}$, and so on. As a result, a video matrix of overlapping video streams can be obtained from the matrix of cameras which capture overlapping images/videos.

Figure 28:
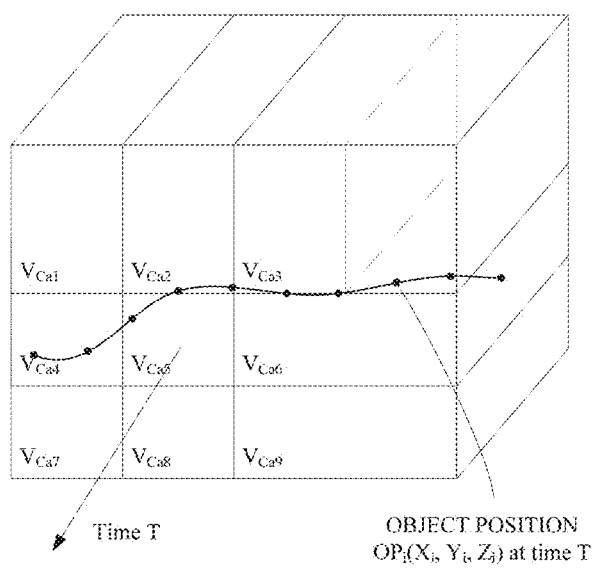
FIG. 28 depicts schematically an object being tracked within the field of view of at least one camera, at any given instant in time, and the physical location of the object can be represented by one or more pixels within the video generated by the at least one camera, according to an embodiment of the present invention.

FIG. 28 depicts schematically an object being tracked within the field of view of at least one camera, at any given instant in time, and the physical location of the object can be represented by one or more pixels within the video generated by the at least one camera, according to an embodiment of the present invention. As shown in in FIG. 28 and previous figures, any point $OP_i(X_i, Y_i, Z_i)$ in the physical space, that is within the field of view of a camera at any given instant in time $T_i$, can be transformed into pixel space $CP_i(X, Y)$ for a specific camera. Since the camera can be identified, the video that is generated by the camera, and the instant in time within that video can be found using any conventional method. If point $OP_i(X_i, Y_i, Z_i)$ is the location in the physical space of an object $O_m$ being tracked, then the pixel location of object $O_m$ can be projected to any pixel $CP_i(X, Y)$ with a video stream being captured by a camera that is in turn part of the camera matrix, provided $OP_i(X_i, Y_i, Z_i)$ is within the field of view of at least one camera within the camera matrix.

It is well known to those skilled in the art that the values of X, Y, Z and T of a plurality of points collected over time can be interpolated using conventional interpolation methods such as Spline interpolation. A point $OP_i(X_i, Y_i, Z_i)$ that depicts the approximate location of the object $O_m$ being tracked can be generated at each instant in time $T_i$ when an image was captured by the camera. As time T moves forward, a moving object with coordinates $OP_i(X_i, Y_i, Z_i)$ may traverse one or more overlapping cameras. Each dot shown in FIG. 28 represents a position of the object at specific instant in time.

Figure 29:
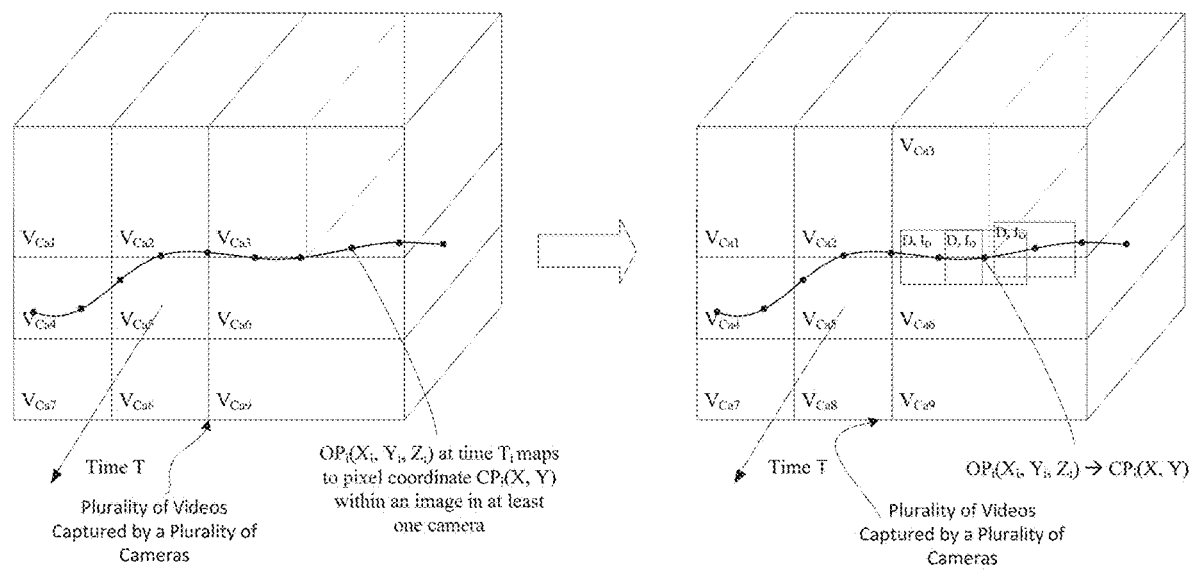
FIG. 29 depicts schematically an object being tracked within the field of view of at least one camera, at any given instant in time, and the physical location of the object can be accurately represented by one or more pixels within the video generated by the camera, and depicts a pixel width and a pixel height of an overlapping region greater than or equal to the pixel width and pixel height of a desired area of interest centered around the one or more pixels representing the object being tracked, according to an embodiment of the present invention.

FIG. 29 depicts schematically an object being tracked within the field of view of at least one camera, at any given instant in time, and the physical location of the object can be accurately represented by one or more pixels within the video generated by the camera, and depicts a pixel width and a pixel height of an overlapping region greater than or equal to the pixel width and pixel height of a desired area of interest centered around the one or more pixels representing the object being tracked, according to an embodiment of the present invention. As time T moves in the forward direction, a moving object may traverse one or more overlapping cameras. Each dot in FIG. 29 represents a position of the object captured by at least one camera at a certain point in time. As shown in FIG. 29, In an embodiment, each tracked point $OP_i$ in the physical space, measured or interpolated, can be mapped to a pixel position $CP_i$ of that point from an image frame $I_{Ca(decoded)}$ from video $V_{Ca}$ captured by a camera Ca. An area of interest image $I_D$ that is substantially centered on pixel position $CP_i$ can then be selected (i.e., around the location of the object of interest). The constraint on the pixel width $D_W$ and pixel height $D_H$ of area of interest $I_D$ is that $D_W \leq O_W$ and $D_H \leq O_H$, where $O_W$ is the amount of overlap in camera video pixels in the horizontal direction and $O_H$ is the amount of overlap in camera video pixels in the vertical direction. Each area of interest $I_D$ for each tracked point in the plurality of tracked points can be computed to exist in its entirety within the video generated by at least one camera. If, for example, the area of interest is located with the overlap region, then the area of interest is within both an image captured by a first camera in the plurality of cameras and another image captured by a second camera in the plurality of cameras.

Figure 30:
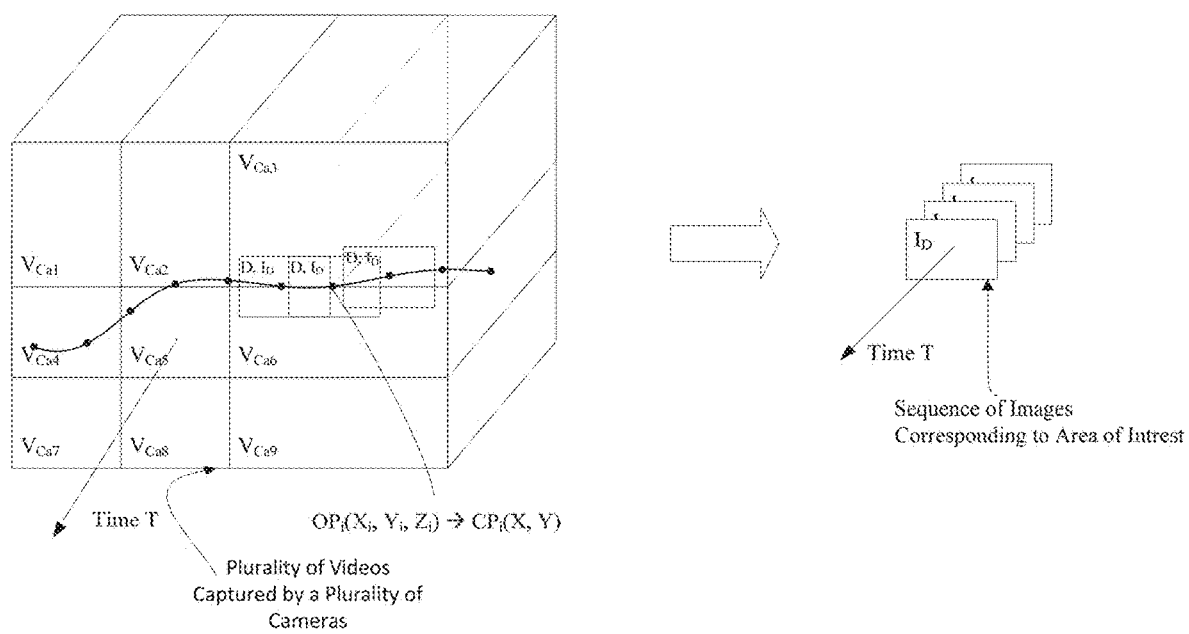
FIG. 30 depicts schematically a plurality of images comprising the desired area of interest centered around the pixel representation of the object being tracked being extracted from a plurality of video codestreams from a plurality of cameras arranged in a matrix of overlapping fields of view, according to an embodiment of the present invention.

FIG. 30 depicts schematically a plurality of images comprising the desired area of interest centered around the pixel representation of the object being tracked being extracted from a plurality of video codestreams from a plurality of cameras arranged in a matrix of overlapping fields of views, according to an embodiment of the present invention. As shown in FIG. 30, In an embodiment, a plurality of area of interest images $I_D$ can be extracted from videos captured by one or more cameras. The images $I_D$ corresponding to the area of interest that are extracted from the videos $V_{Ca1}$, $V_{Ca2}$, etc. can be arranged in sequence or encoded to form a video (e.g., a time-lapse video), as described in the following paragraph.

Figure 31:
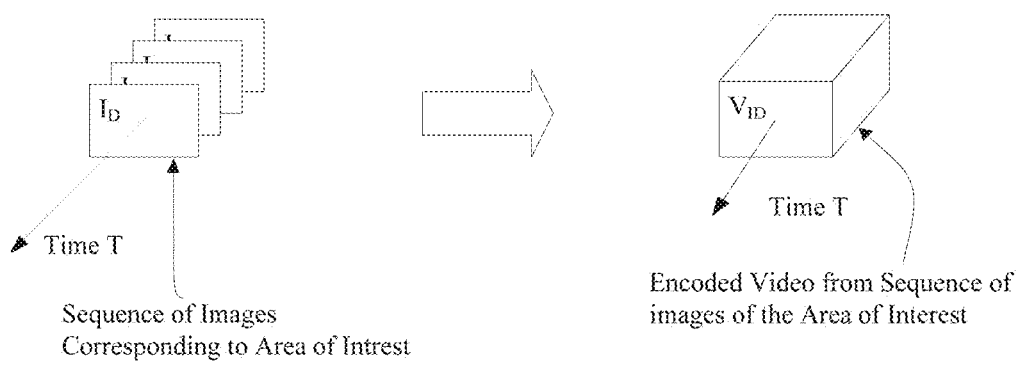
FIG. 31 depicts that a plurality of images comprising of the desired area of interest centered around the pixel representation of the object being tracked are extracted from a plurality of video codestreams from a plurality of cameras arranged in a matrix of overlapping fields of view and then converted into a video codestream in a known format and encoding, according to an embodiment of the present invention.

FIG. 31 depicts a plurality of images comprising the desired area of interest centered around the pixel representation of the object being tracked are extracted from a plurality of video codestreams from a plurality of cameras arranged in a matrix of overlapping fields of view and then converted into a video codestream in a known format and encoding, according to an embodiment of the present invention. As shown in FIG. 31, In an embodiment, a plurality of area of interest images, each image being similar to $I_D$, can be encoded into a video codestream $V_{ID}$ of a known format and encoding.

Figure 32:
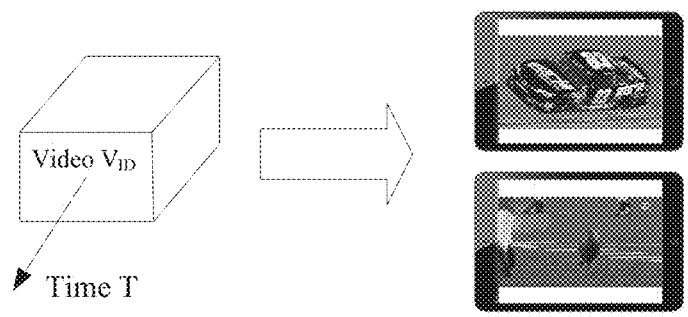
FIG. 32 depicts schematically a plurality of images comprising the desired area of interest centered around the pixel representing the object being tracked being extracted from a plurality of video codestreams from a plurality of cameras arranged in a matrix of overlapping fields of view and converted into a video codestream in a known format and encoding and transmitted over a LAN, WAN or Internet to a computing device for decoding, viewing or image processing and analysis or display on a display device, according to an embodiment of the present invention.

FIG. 32 depicts schematically a plurality of images comprising the desired area of interest centered around the pixel representing the object being tracked being extracted from a plurality of video codestreams from a plurality of cameras arranged in a matrix of overlapping fields of view and converted into a video codestream in a known format and encoding and transmitted over a LAN, WAN or Internet to a computing device for decoding, viewing or image processing and analysis or display on a display device, according to an embodiment of the present invention. As shown in FIG. 32, in an embodiment, a first video codestream $V_{ID}$ of a known format and encoding can be transmitted to a first consumer application such as an APPLE iPad® application or an ANDROID application or a desktop computer software application or a client software program, where the video $V_{ID}$ is generated to follow a first object $O_m$ and the first object $O_m$ is selected for being followed by the first consumer application. In another embodiment, a second video codestream $V_{ID}$ of a known format and encoding can be transmitted to a second consumer application such as an APPLE iPad® application or ANDROID application or a desktop computer software application or a client software program, where the video $V_{ID}$ is generated to follow a second object $O_m$ and the second object $O_m$ is selected for being followed by the second consumer application. The second object can be the same or different from the first object.

Figure 33:
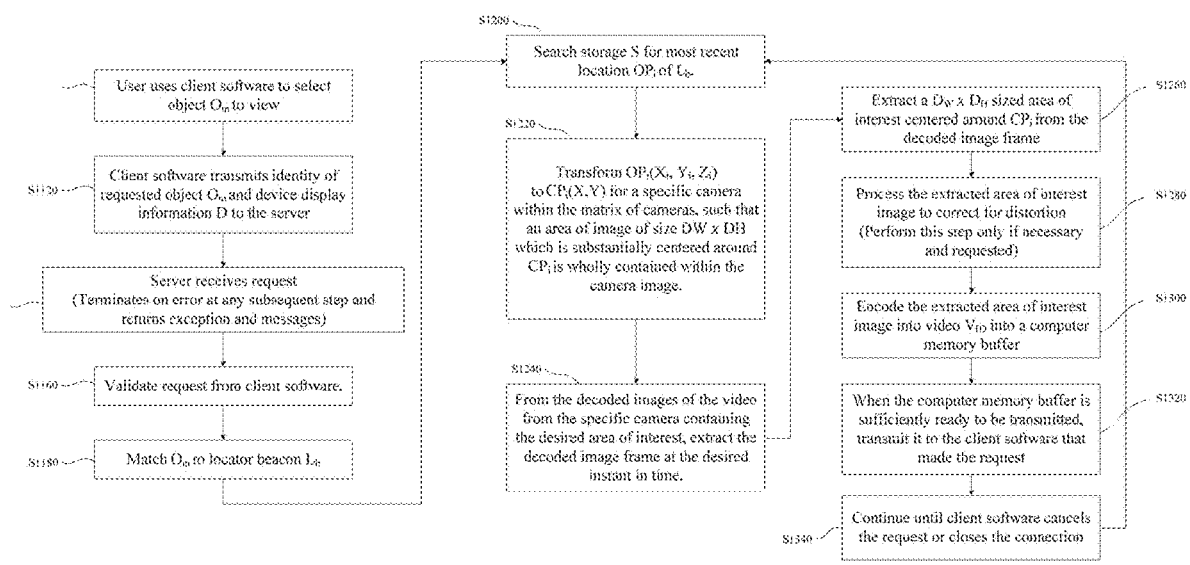
FIG. 33 depicts a flowchart of a method of delivering a video of an area of interest centered on the physical position of an object being tracked live, according to an embodiment of the present invention.

FIG. 33 depicts a flowchart of a method of delivering a video of an area of interest centered on the physical position of an object being tracked, according to an embodiment of the present invention. In an embodiment, a client requests for a live video that follows an object $O_m$ where the pixel requested dimensions of the video are $D_W$ pixel wide by $D_H$ pixels high. At S1100, a user selects an object $O_m$ to be followed and viewed for display or processing D, a user being a human or a computer software program or other interface element or device. At S1120, client software sends the identity of $O_m$ and the specification of D, for example width $D_W$ and height $D_H$ (e.g., display window dimensions). For example, the user may send the dimensions of a screen of tablet screen or a screen of smart phone screen or a window within on a screen of personal computer, or television (TV) screen or a window or portion of the TV screen, etc. The client sends this request over LAN, WAN or the Internet and may use the HTTP or secure HTTP (HTTPS) or any other computer network protocol such as $TCP_i$ ATM, etc. At S1140, server software receives the request. In an embodiment, for all subsequent operations by the server, the server may choose to exit upon error and report an exception with an error message, if an error occurs.

At S1160, the server validates the request from the client software. The validation includes determining that object $O_m$ is indeed within the field of view of at least one camera within the matrix of cameras and that the area of interest $D_W$ and $D_H$ dimensions (for example, corresponding to the display dimensions) follow the constraints on the overlapping pixel width $O_W$ and overlapping pixel height $O_H$ for each video, for each camera. That is $D_W \leq O_W$ and $D_H \leq O_H$, where $O_W$ is the amount of overlap in camera video pixels in the horizontal direction and $O_H$ is the amount of overlap in camera video pixels in the vertical direction). In an embodiment, the cameras are static and do not pan, tilt or zoom. In an embodiment, the cameras are color-matched and synchronized. The cameras are arranged in a matrix such that there is sufficient overlap of the field of view of the cameras so that the overlap in pixels of the captured images or videos is at least $O_W$ pixels wide and $O_H$ pixels tall.

In an embodiment, after performing the validation at S1160, the server finds data, at S1180, from the locator beacon $L_b$ for object $O_m$. The server searches for and finds the most recent data from locator $L_b$. Within the data from locator $L_b$, the server finds or computes physical object location $OP_i$ at S1200. At S1220, the server uses data from the locator to compute the camera Ca within the matrix of cameras, that wholly contains an area of interest that is $D_W$ pixels wide by $D_H$ pixels tall and centered substantially at pixel coordinate or position $CP_i$. $CP_i$ is the pixel coordinate in an image, at a specific instant in time, from the video captured by the camera Ca corresponding to physical object location $OP_i$ of object $O_m$ captured by camera Ca. The server transforms the physical position $OP_i(X_i, Y_i, Z_i)$ obtained from the locator beacon data $L_b$ into pixel position $CP_i(X_i, Y_i)$ within an image for a specific camera such that an area of an image of size $D_W \times D_H$ which is substantially centered around position $CP_i$ is wholly contained within the camera image.

At S1240, an image at the specific instant in time is decoded from the selected video from the selected camera. The video is live. At S1260, the area of interest that is $D_W$ pixels wide by $D_H$ pixels tall is extracted from the decoded image. The object $O_m$ is substantially at the center of the decoded image. If further image processing is required to correct the image for distortions, it is performed at S1280. The area of interest image that is $D_W$ pixels wide by $D_H$ pixels tall is then encoded into the video codestream $V_{ID}$. The video codestream is for example stored in a computer memory buffer, at S1300. At S1320, when the computer memory buffer has sufficient data for transmission, the computer transmits the data to the client that made the request. At S1340, the method repeats the searching of the storage for location physical object location $OP_i$ at S1200 to get the next physical or interpolated location of $OP_i$ from locator beacon data $L_b$ that was computed by $C_o$ and stored on storage device S and repeats the next steps at S1220, S1240, S1260, S1280, S1300 and S1300, as needed, until the client cancels the requests or ends the processing or closes the connection, at S1340. In case the client closes the connection or cancels the request or ends the processing, the method ends at S1340.

Figure 34:
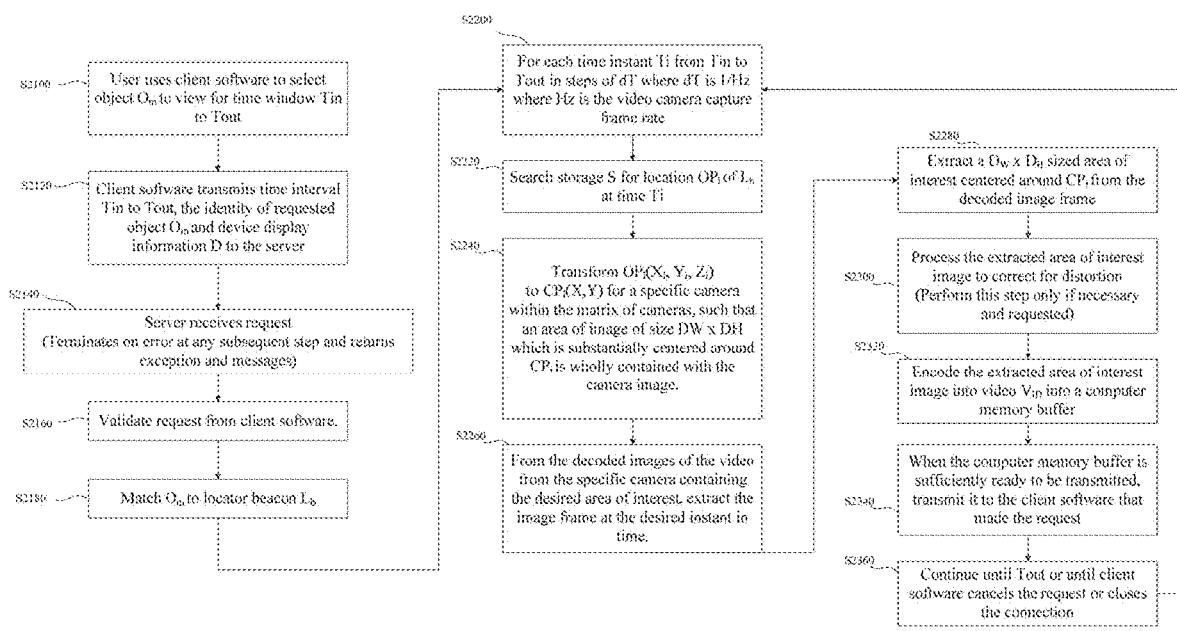
FIG. 34 depicts a flowchart of a method of delivering a video of an area of interest centered on the physical position of an object being tracked from an existing archive for a requested time window, according to an embodiment of the present invention.

FIG. 34 depicts a flowchart of a method of delivering a video of an area of interest centered on the physical position of an object being tracked from an existing archive for a requested time window, according to an embodiment of the present invention. The method starts when a client requests for an existing archived video that follows an object $O_m$ where the pixel requested dimensions of the video are $D_W$ pixel wide by $D_H$ pixels tall. At S2100, a user selects an object $O_m$ to be followed and viewed for display or processing D. The user can be a human or a computer software program or other interface element. The user also selects a time window $T_{in}$ to $T_{out}$ between which the user wishes to follow the object, where $T_{in}<T_{out}$. This can be, for example, as a result of a request to replay a portion of a video after the event has occurred. At S2120, client software sends the identity of $O_m$ and the specification of D, for example $D_W$ and $D_H$ and the time window $T_{in}$ to $T_{out}$. In one embodiment, the client may send this request over a local area network (LAN), a wide area network (WAN) or the Internet and may use the HTTP or secure HTTP (HTTPS) or any other computer network protocol such as $TCP_i$ ATM, etc. At S2140, the server software receives the request. The server may choose to exit is an error occurs and report an exception with an error message. At S2160, the server validates the request from the client software. Validation includes verifying that there is content for the specific time window, and/or determining whether $O_m$ is indeed within the field of view of at least one camera within the plurality of cameras and determining whether the area of interest dimensions $D_W$ and $D_H$ is contained within the overlapping pixel width $O_W$ and within an overlapping pixel height $O_H$ for each video from each camera. In an embodiment, the cameras are static and do not pan, tilt or zoom. In an embodiment, the cameras are color-matched and/or synchronized. The cameras are arranged in a matrix such that there is sufficient overlap between the field of view of the cameras so that the overlap in pixels of the resulting video is at least $O_W$ pixels wide and $O_H$ pixels tall.

After validation, at S2180, the server finds data from the locator beacon $L_b$ for object $O_m$. At S2200, the server enters a loop for each time instant $T_i$ starting from $T_{in}$ to $T_{out}$ in steps of dT where dT is 1/Hz (Hz is the video camera capture frame rate). At S2220, the server searches storage device S for and finds the data from locator beacon $L_b$ at time $T_i$. At S2220, within that data for $L_b$, the server finds or computes the physical location $OP_i$ of object $O_m$. At S2240, the server computes the camera Ca within the matrix of cameras, that wholly contains an area of interest that is $D_W$ pixels wide by $D_H$ pixels tall and centered substantially around pixel position $CP_i$ in the image of video containing the captured object Om that corresponds to physical $OP_i$ of object $O_m$. In other words, $CP_i$ is the pixel coordinate in an image, at a specific instant in time, from the video captured by the camera Ca corresponding to physical object location $OP_i$ of object $O_m$ captured by camera Ca.

At S2260, an image at the specific instant in time is decoded from the selected video from the selected camera. The video is archived on a storage device S from a prior capture. At S2280, the area of interest that is $D_W$ pixels wide by $D_H$ pixels tall is extracted from the decoded image. $CP_i$ is substantially at the center of this image. Thus object $O_m$ is substantially captured at the center of the image. If further image processing may be needed to correct the image for distortions, it is performed at 52300. The area of interest image that is $D_W$ pixels wide by $D_H$ pixels tall is then encoded into the video codestream $V_{ID}$ and stored, for example, in a computer memory buffer, at S2320. At S2340, when the computer memory buffer has sufficient data for transmission, for example, the server transmits the data containing the video codestream $V_{ID}$ in the memory buffer to the client that made the request. At S2360, the method goes to S2200 and repeats the procedures S220, S2240 and S2260, as needed, to get the next physical or interpolated location of $OP_i$ from location $L_b$ at the next time $T_i$, which is computed by server $C_o$ and stored on storage S. If and/or when $T_i$ reaches time $T_{out}$ or the client closes the connection or cancels the request, the method ends at S2360.

Figure 36D:
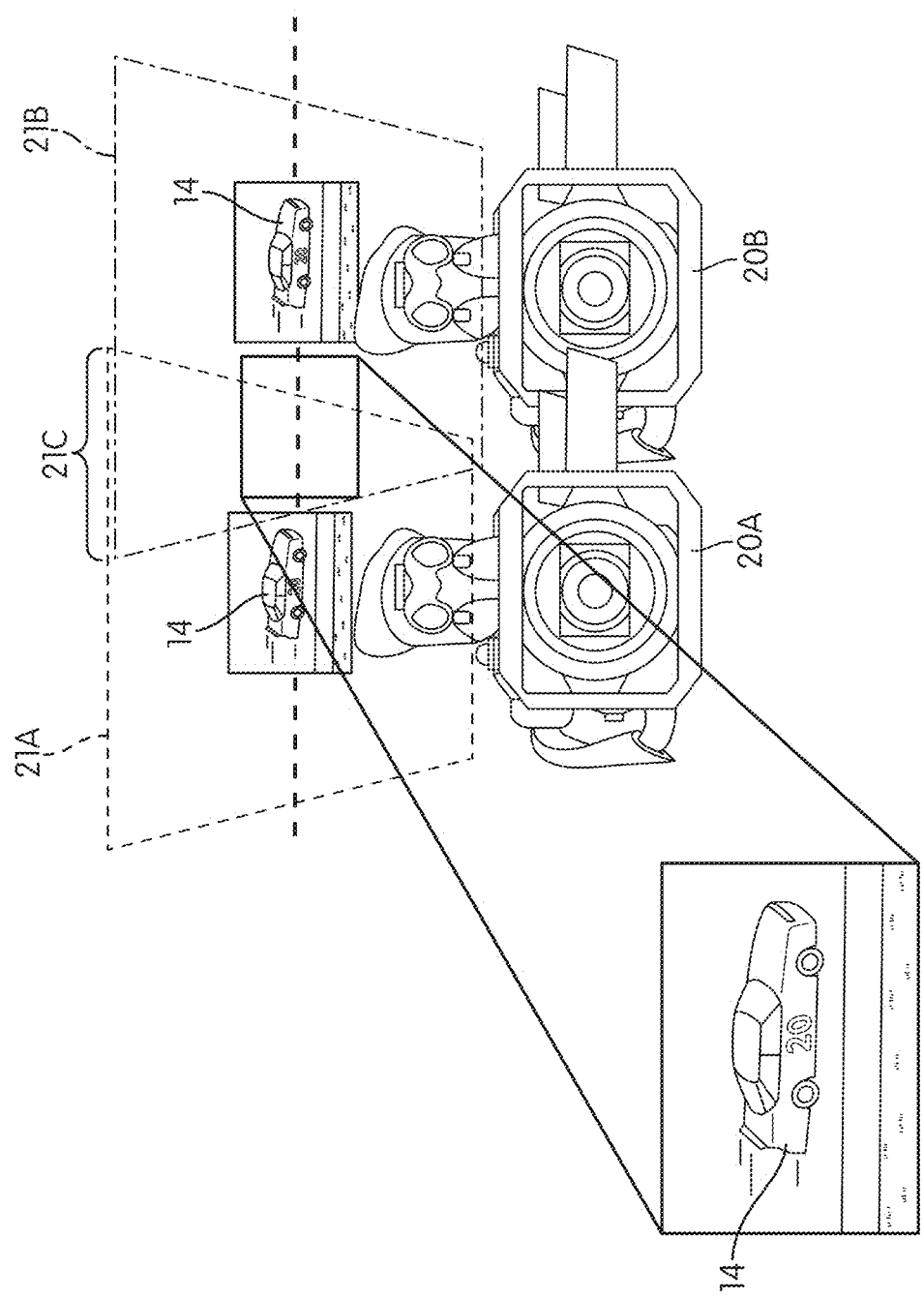

In the following paragraphs, some examples of implementation of the present invention will be described. FIGS. 36A-36D depict an example of providing a video of an object of interest on-demand based on a selection of the object by a user, according to an embodiment of the present invention. For example, a plurality of cameras (not shown in FIG. 36A) can be distributed around the race track (e.g., NASCAR race track) 12 shown in FIG. 36A. The cameras are static (do not tilt, do not pan and do not zoom) and thus each camera has one orientation and captures a specific field of view. For example, the plurality of cameras can be arranged so as to cover the entire track 12. As shown in FIG. 36D, adjacent cameras 20A and 20B have overlapping field of view (FOV) 21A and 21B so as to capture images or videos containing objects of interest in overlapping region 21C, for example. An object (in this case a race car) 14 having a location tracking device or locator beacon such as a geo positioning system (GPS) location device, upon selection by a user, can be followed by the user along the race track 12. Each camera 20A and 20B will capture a series of sequential images or frames within its specific field of view 21A and 21B, respectively. As it can be appreciated, the overlap region 21C can provide a smooth transition from the sequence of frames captured by the camera 20A to the sequence of images or frames captured by the camera 20B during the transition of the race car 14 from the field of view 21A of camera 20A to the field of view of camera 20B in the race track 12. As depicted in FIGS. 36B and 36C, a user can employ a viewing device such as a tablet 16 or a smartphone 18, etc. As illustrated in FIGS. 36B and 36C, a first user may be following and viewing selected race car 14A on display device (e.g., the tablet) 16 while a second user may be following and viewing a different selected race car 14B on display device (e.g., the smartphone) 18. Each user can select a car of interest as desired by activating or pointing on the car of interest using a pointer device or the like (or a finger touch on a touch sensitive device such as a tablet, for example). As shown in FIGS. 36B and 36C, the users can view completely distinct sets of images or videos. While a first user with display device 16 is viewing race car 14A racing in the race track 12, a second user has just witnessed a collision between race car 14B and other race cars and a track barrier in the race track 12. Although, as illustrated in this example, each user is viewing a different set of images or videos, other users may select the same race car and thus be able to follow the same race car (object) and thus view the same set of images. In addition, other users may select a race car that will be within the same field of view as another car in the race track (for example, two cars close to each other or passing each other) and thus the user will be able to view in at least a period of time images or videos containing both the race car of interest to one user and the race car of interest to another user. Although an example of implementation is provided herein while using a car race (e.g. NASCAR, FORMULA 1), the same can be applied to a derby or horse race, a boat race, a motorbike race, a bicycle race, or a marathon race or other track run, a ski race, a skating race, etc.

Figure 37:
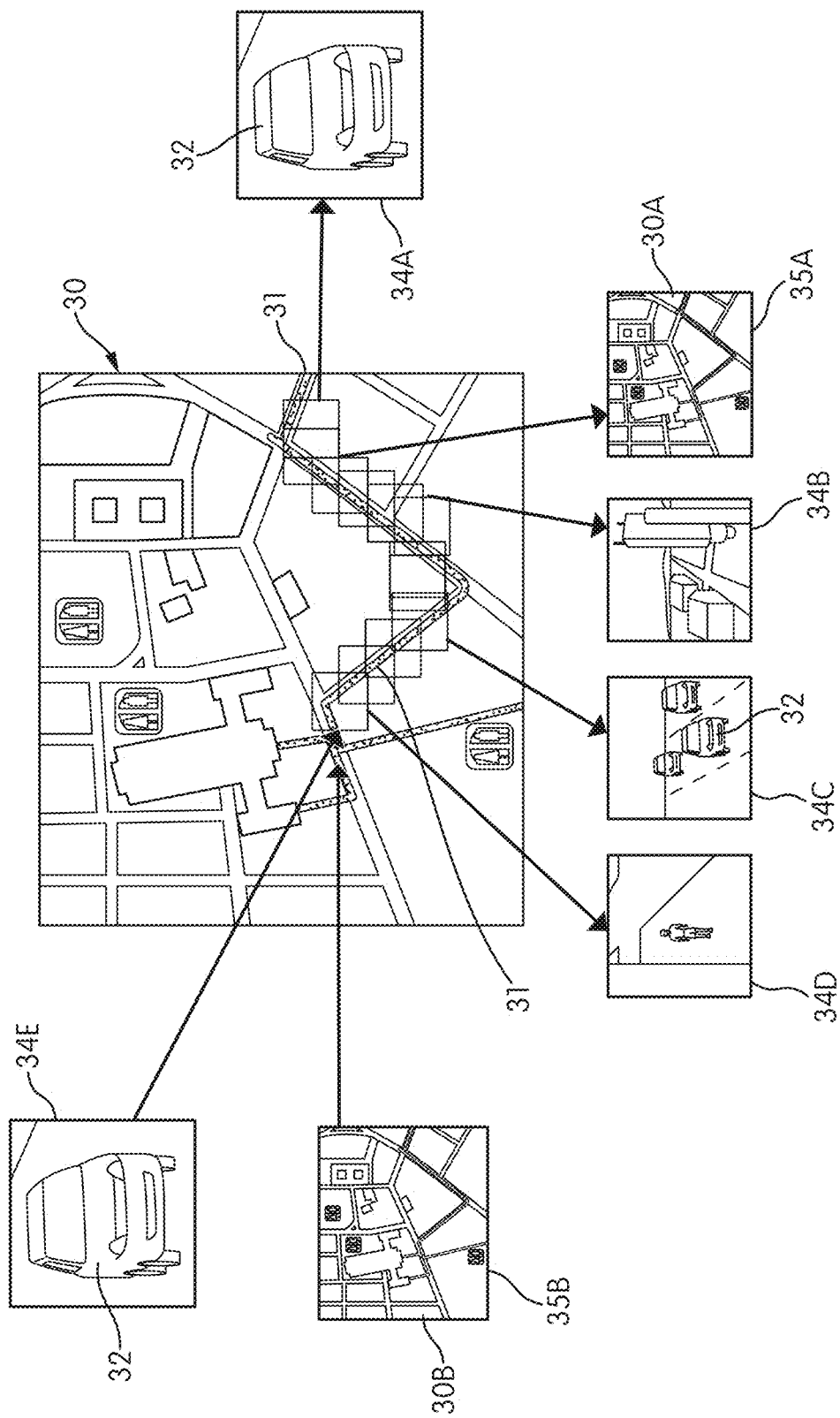
FIG. 37 depicts another example of providing a video of an object of interest on-demand based on a selection of the object by a user, according to another embodiment of the present invention.

FIG. 37 depicts another example of providing a video of an object of interest on-demand based on a selection of the object by a user, according to another embodiment of the present invention. For example, video tracking of a suspect car by a law enforcement agency can be accomplished by using the method described herein. For example, upon selection by a law enforcement officer of a car of interest or person of interest, the system is able to deliver a video showing and following the car or person of interest on a display device of the law enforcement officer without the law enforcement officer switching between a plurality of display devices or manually switching between cameras as is performed by conventional methods and systems. FIG. 37 depicts a geographical map 30 of a city showing a path 31 taken by a car of interest 32 tracked by the law enforcement agency. The law enforcement officer can track the car of interest 32 on his display device (e.g., a tablet, a computer screen or the like) along the path 31 taken by the car of interest 32. There are many cameras placed in various locations along streets within the city. For example, the cameras can be placed on specific buildings or structures while pointing to specific directions to capture specific field of views. The system and method described herein is able to determine a camera within the plurality of cameras that wholly contains the car of interest (tracked by the law enforcement officer) using the physical location of the car (acquired from the locator beacon such as a GPS device on the car) and extract the area of interest corresponding to the physical location of car of interest, as shown in images 34A-E. The system and the method can deliver images or a video of the car of interest 32 while the car 32 is driving in the city. The system is able to "switch" from images captured by one camera to an adjacent camera seamlessly to provide a continuous video showing the car 32 driving in the streets of the city and thus allowing the law enforcement officer to assess the position of the car 32 on the map 30. If a camera is not operating properly or there is a "blind area" or a field of view not captured by any of the cameras in the city, the system can switch or revert back to a map mode to display a portion 30A of the map 30 or the position of the car of interest on the portion 30B of the map 30, depending on the location of the car 32, as shown in images 35A-B.

Figure 38:
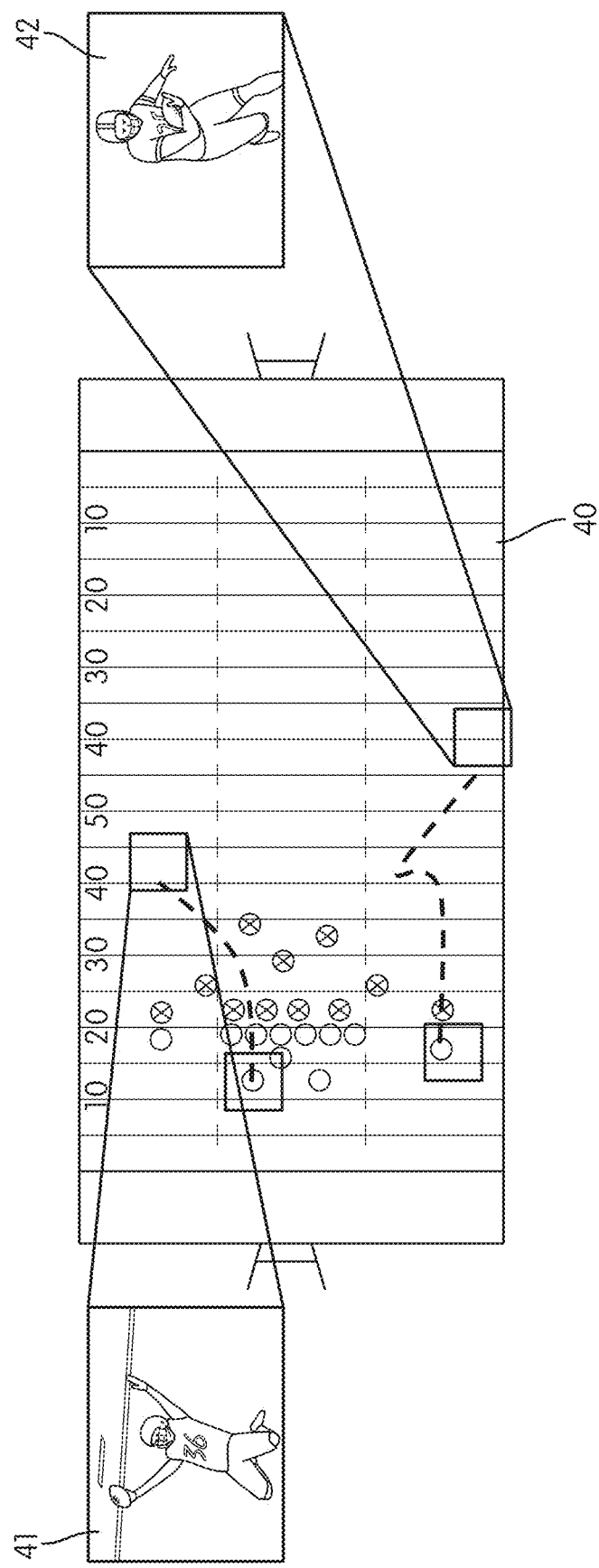
FIG. 38 depicts another example of providing a video of an object of interest on-demand based on a selection of the object by a user, according to another embodiment of the present invention.

FIG. 38 depicts another example of providing a video of an object of interest on-demand based on a selection of the object by a user, according to another embodiment of the present invention. FIG. 38 shows a virtual football field 40 for fantasy team gameplay. A plurality of cameras (not shown) are arranged in a plurality of football stadiums (e.g., NFL stadium). Each camera in the plurality of cameras captures images within a specific field of view in a specific football stadium. In an embodiment, the field of views of adjacent cameras in any football stadium can be arranged so as to overlap to provide an overlap area or zone. The various videos from the different cameras in each stadium can be stored in a storage device and, as described above, the position of a player on the football stadium is linked to an image of the football player stored in the video captured by one or more of the plurality of cameras. This is performed for each player and for each game in each of the plurality of football stadiums. A user or gamer is able to select a fantasy team by assembling players from real teams. When a fantasy player in a gamer's fantasy team scores a "down" (e.g., a touchdown, first down, etc.), as shown in images 41 and 42, a video snippet can be played to the gamer showing the fantasy player scoring a touchdown or at a first down. The video snippet is extracted from the images in the videos stored in the storage device in accordance to the position of the fantasy player on the fantasy field. The video snippet is a clip of video of finite duration. This video snippet can be extracted using the methods described in the above paragraphs because the plurality of cameras capturing the video have a known overlap of each of their FOV and the cameras are arranged to ensure an effective matrix configuration of the resulting content captured by the cameras. Therefore, as it can be appreciated from the above, various football games (NFL, or school games, etc.) can be made accessible at all times within a single application. Various videos can be delivered on-demand to fans with the ability for each fan to select a specific player in order to view a video of the player in action. This can appear to each fan as being in the director seat and controlling a virtual camera while having the freedom to virtually "tilt", "pan" and/or "zoom in/out" the virtual camera to "point" the camera on a player of interest without the fan physically controlling any real camera in a football stadium. The term "virtual camera" is used herein to indicate that the camera is not real and the user is able to control the virtual camera as if it is a real moving camera (a camera that is able to zoom in/out, tilt and/or pan) to follow an object of interest to the user. This also provides an alternative streaming solution for a plurality (millions to hundreds of millions) of smart devices (tablets and smart phones) in the market. In addition, this allows casting alternative video streaming from the smart devices to televisions independent of traditional cable television subscriptions. This system also enables "speedwatch" functionality to fans to allow the fans to watch only their subjects of interests and on-demand.

Figure 39D:
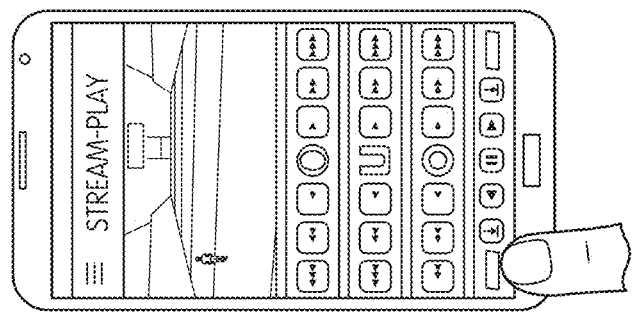
FIGS. 39A-39D depict an example of a display device (e.g., a smart device) for viewing a custom on-demand video of an object of interest, according to an embodiment of the present invention.
Figure 39C:
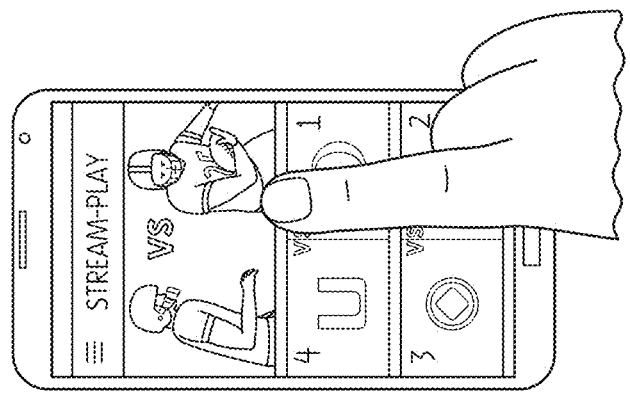
Figure 39B:
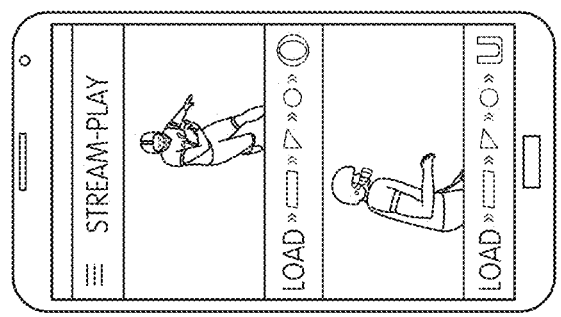
Figure 39A:
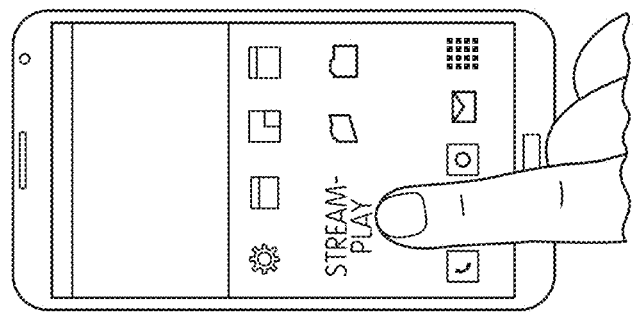

FIGS. 39A-39D depict an example of a display device (e.g., a smart device) for viewing a custom on-demand video of an object of interest, according to an embodiment of the present invention. For example, when a fan purchases officially licensed team merchandize, credential information may be included with the merchandize to enable the fan to access a "StreamPlay" service to allow the fan to watch or view a custom video of a player of the licensed team. In order to access the "StreamPlay" service, the fan first downloads or opens a software application (APP) on a smart device, for example, as shown in FIG. 39A. The fan then validates the team that is associated with the merchandize that the fan purchased and loads the APP on the smart device, as shown in FIG. 39B. In an embodiment, during the loading of the APP on the smart device, team specific highlights can be played to the fan to attract or retain the attention of the fan while the APP loads. Various games played by the team associated with the purchased merchandize and validated by the fan are listed to the fan on the smart device. The fan then selects a specific game to watch, as shown in FIG. 39C. The user or fan is also provided with a graphical user interface (GUI) and functionality to control or customize his viewing experience, as shown in FIG. 39D. In an embodiment, the game begins in portrait mode while providing the option to switch to landscape mode if desired by pressing on a button in the GUI. In another embodiment, the switching of the viewing mode from portrait to landscape can simply be accomplished by turning the smart device by 90 deg., as is generally performed in any smart device.

Figure 40A:
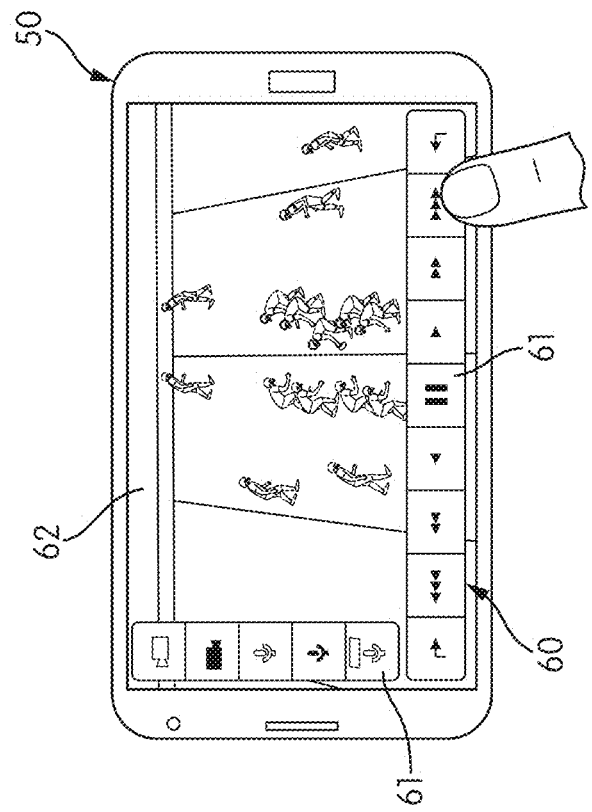
FIGS. 40A-40D depict an example of interaction of a user on graphical user interface (GUI) providing functionality to access a custom video, according to an embodiment of the present invention.

FIGS. 40A-40D depict an example of interaction of a user on graphical user interface (GUI) providing functionality to access a custom video, according to an embodiment of the present invention. As discussed in the above paragraphs, a plurality of fixed-point cameras are mounted in various stadiums to capture videos from their specific field of views. The captured videos are transmitted to a video server. In an embodiment, the videos can be stitched together or provided with some overlap to allow a smooth transition from a view captured by one camera to a view captured by an adjacent camera. In an embodiment, digital audio of play-by-play of the game (home team and away team) is also captured and transmitted to an audio server (which can be the same or different from the video server). Game metadata is also generated during the live transmission of the video and audio data to the video server and audio server. The game metadata is detailed information about the game after completion of the game. For example, in an embodiment, individual player statistics and game statistics are included in the game metadata. For example, additional information can also be added by subject matter experts such as commentators. For example, trivia information and relationships of a specific aspect of the specific portion of a specific game in relation to similar situations in past games may also be included in the game metadata. For example, during the game, play-by-play information is added by the game administrators or game service providers (for example, NFL). This information is added in the form of game metadata. Such game metadata is presented during the recorded broadcast of the games and is made available to subscribers over the Internet. The videos and the audios along with the metadata are processed and exported or transmitted to individual user or fan devices (e.g., smart devices) 50 to display custom videos based on input selections from the user or fan, in accordance to the method described in the above paragraphs, as shown in FIG. 40A. In an embodiment, the user or fan can, for example, make appropriate selections and take appropriate actions using a graphical user interface (GUI) 60 incorporated within the received custom video 62. For example, the GUI 60 can include semi-transparent navigation controls 61 with functionality that minimizes viewing distraction and reducing clutter, as shown in FIG. 40A.

Figure 40B:
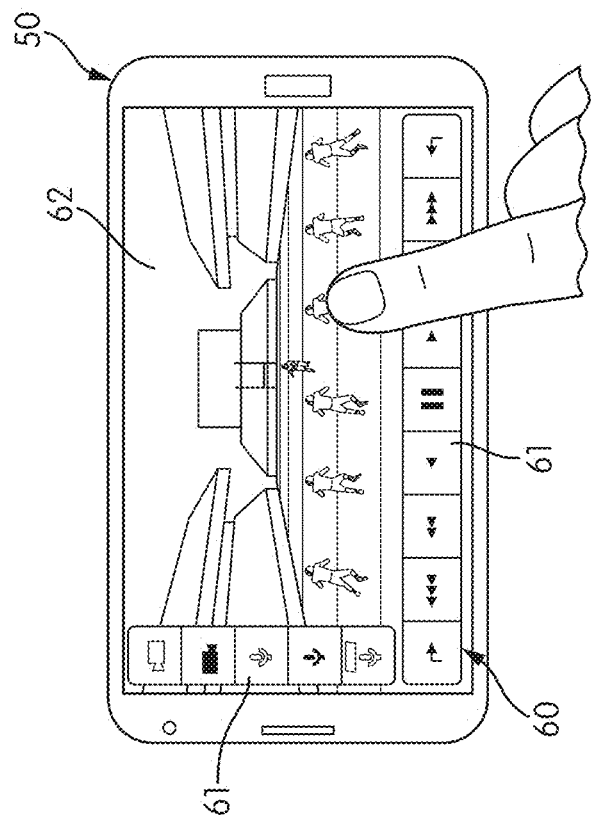
Figure 40D:
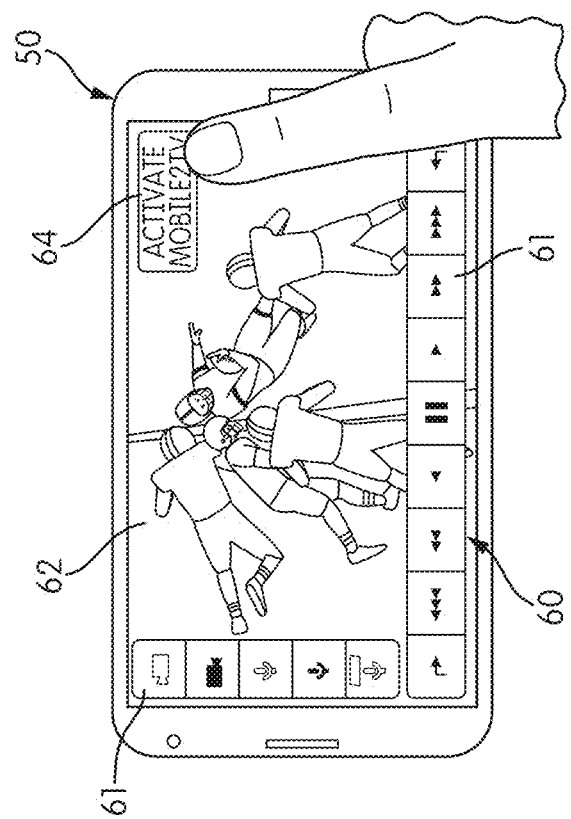
Figure 40C:
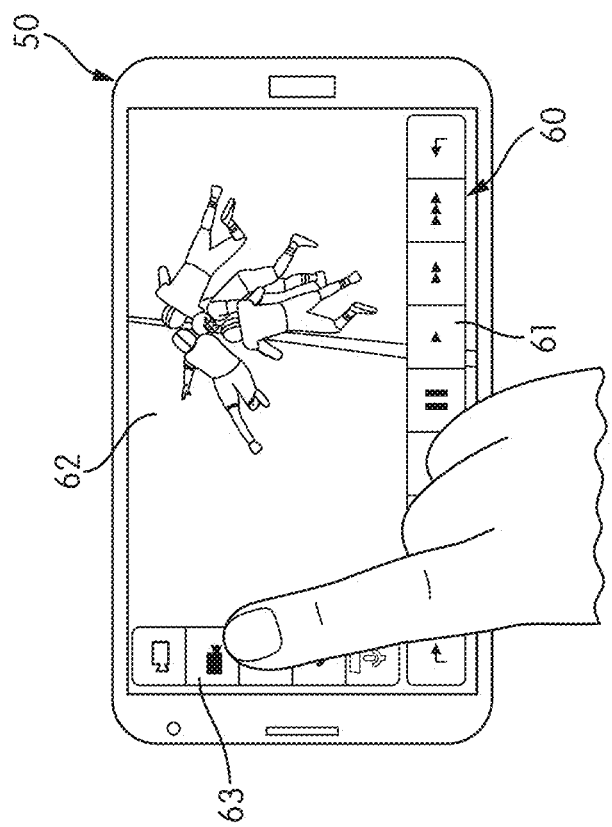

The functionality provided through semi-transparent controls 61 of the GUI 60 allows a use or fan to control various inputs including stop and playback and rewind to first downs, big play, scoring plays, etc, as shown in FIG. 40B. The control in the GUI 60 also allows a user to quickly navigate to home team or visitor team cameras, as well as listen to home team, visitor team or media (e.g., ESPN) radio broadcasts. The semi-transparent controls 61 of the GUI 60 display upon a user touches the display of the smart device 50 and fade out if no input or action is received by the GUI 60 after a certain period of time (few seconds to few minutes) has elapsed. The period of time can be set by the user or fan as desired. The system can select the best viewing angle for the user depending on the selection of the player made by the user. However, the user is also able to control the viewing angle by selecting an appropriate camera icon 63, as shown in FIG. 40C. The GUI 60 of the system also provides the functionality to send the game or the custom video being viewed by the user on the screen of the smart device 50 to a remote television by pressing on a button "Activate Mobile2TV" 64, as shown in FIG. 40D.

FIG. 41 depicts another configuration of the GUI that is displayed a display device (e.g., a smart device) 50 of a user, according to an embodiment of the present invention. In an embodiment, once the user or fan presses the button "Activate Mobile2TV" 64, as shown in FIG. 40D, the video streamed on the smart device 50 is sent to a television 70, as shown in FIG. 41. In an embodiment, as a result of sending the custom video from the smart device 50 to the television 70, the GUI 60 on the smart device changes its configuration to display instead football field configuration with a plurality of icons 65 representing the position of the plurality of cameras around the football stadium. Therefore, in an embodiment, the custom video is played on the television but the control functionality provided by the GUI stays on the smart device. This allows a remote interaction of the fan or user with the game as a whole. The user is able, for example, to select a player to display on the screen. The user is also able to select the camera by selecting (clicking or touching) the corresponding icon 66 on GUI 60 and thus be able to watch the video from that camera point of view. The user has enhanced camera controls and has complete control over virtual movement (tilt, zoom, pan, etc.) of a virtual camera. Furthermore, the user has greater control over forward and backward play via speedwatch functionality. As it can be appreciated, the user or fan plays the role of "a movie director" that has control over which view or camera to select. In an embodiment, the GUI 60 can further provide to the user or fan the functionality of taking screenshots or storing video clips and posting the video clips and/or the screen shots to social media. In an embodiment, while the user is interacting with the GUI 60 to control various features of custom video of the game, the custom video is still played on the television screen 70. In an embodiment, advertisement images, scoreboards and other graphics or writings (such as logos, badges, etc.) may be inserted by the system (computer server) into the custom video automatically or as controlled by the computer server to provide additional revenue generation. In an embodiment, the advertisement or other graphics may be tailored depending on the player or team selected by the user. In an embodiment, the insertion of the advertisement is not control by the user but tailored by the computer server according to the team selected by the user. For example, if the home team is the Washington Redskins®, an advertisement showing a particular restaurant in Washington, D.C. can be displayed in addition to the custom video of the football game selected by the user.

As it can be appreciated from the above paragraphs, dynamic video streams (DVS), referred in the above paragraphs as videos or images, are generated from multiple geo-referenced fixed video cameras. The video streams are custom generated according to inputs of the user such as a selection of a specific object or target of interest to be watched or followed. The DVS dynamically tracks the targets of interest from camera to camera based on target locations. The DVS provides at least one video stream for each object of interest using video(s) or images captured by one or more the plurality of cameras. Multiple targets of interest can be tracked simultaneously.

In an embodiment, the method or methods described above can be implemented as a series of instructions which can be executed by a computer, the computer having one or more processors or computer processor units (CPUs). As it can be appreciated, the term "computer" is used herein to encompass any type of computing system or device including a personal computer (e.g., a desktop computer, a laptop computer, a tablet, a smartphone, or any other handheld computing device), or a mainframe computer (e.g., an IBM mainframe), or a supercomputer (e.g., a CRAY computer), or a plurality of networked computers in a distributed computing environment.

For example, the method(s) may be implemented as a software program application which can be stored in a computer readable medium such as hard disks, CDROMs, optical disks, DVDs, magnetic optical disks, RAMs, EPROMs, EEPROMs, magnetic or optical cards, flash cards (e.g., a USB flash card), PCMCIA memory cards, smart cards, or other media.

Alternatively, a portion or the whole software program product can be downloaded from a remote computer or server via a network such as the internet, an ATM network, a wide area network (WAN) or a local area network.

Alternatively, instead or in addition to implementing the method as computer program product(s) (e.g., as software products) embodied in a computer, the method can be implemented as hardware in which for example an application specific integrated circuit (ASIC) can be designed to implement the method.

Various databases can be used which may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Standard Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files (e.g., images or video(s)) and associated data or file descriptions, administrative information, or any other data (e.g., metadata of the images or video(s)).

Figure 35:
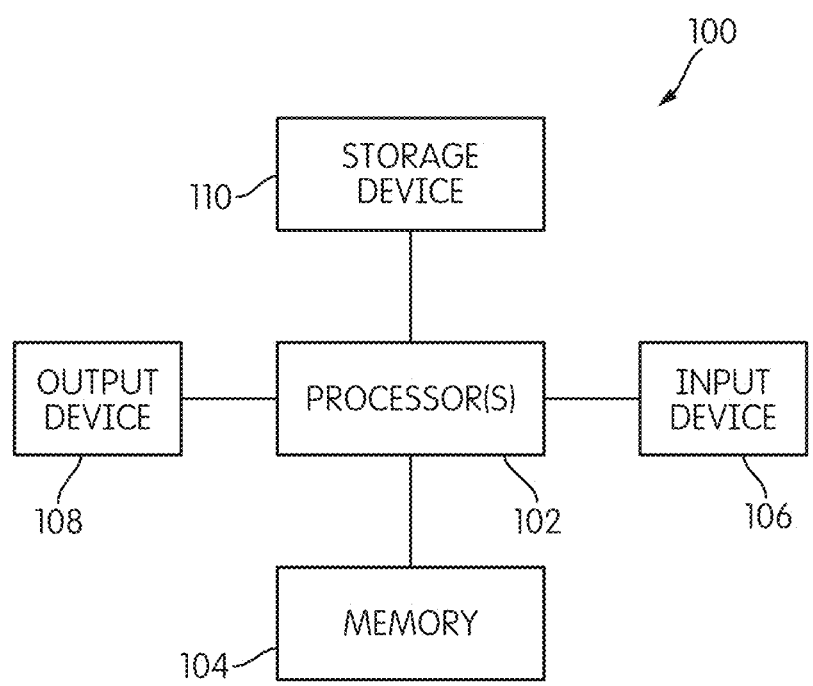
FIG. 35 depicts an example of a computer system for implementing one or more of the methods and systems of delivering or viewing a video of an area of interest centered on a physical location of an object being tracked, according to an embodiment of the present invention.

FIG. 35 depicts an example of a computer system (e.g., a computer server) for implementing one or more of the methods and systems of delivering or viewing a video of an area of interest centered on a physical location of an object being tracked, according to an embodiment of the present invention. FIG. 35 is a schematic diagram representing a computer system 100 for implementing the methods, according to an embodiment of the present invention. As shown in FIG. 35, computer system 100 comprises a computer processor unit (e.g., one or more computer processor units) 102 and a memory 104 in communication with the processor 102. The computer system 100 may further include an input device 106 for inputting data (such as keyboard, a mouse, a joystick, a game controller, a touchscreen, etc.) and an output device 108 such as a display device for displaying results of the computation (e.g., computer monitor, tablet, smartphone, head mounted device HMD, etc.). The computer system 100 may further include or be in communication with a storage device 110 for storing data such as, but not limited to, a hard-drive, a network attached storage (NAS) device, a storage area network (SAN), etc. It must be appreciated that the term computer processor unit or processor is used herein to encompass one or more computer processor units. Where reference is made to a processor or computer processor unit that term should be understood to encompass any of these computing arrangements.

Although the various steps of the method(s) are described in the above paragraphs as occurring in a certain order, the present application is not bound by the order in which the various steps occur. In fact, in alternative embodiments, the various steps can be executed in an order different from the order described above.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Furthermore, since numerous modifications and changes will readily occur to those of skill in the art, it is not desired to limit the invention to the exact construction and operation described herein. Accordingly, all suitable modifications and equivalents should be considered as falling within the spirit and scope of the invention.

What is claimed:

1. A method of selecting an area of interest from a plurality of images captured by a plurality of cameras, the method being implemented by a computer system that includes one or more processors configured to execute computer program instructions, the method comprising:
   receiving, by the one or more processors, a request for an area of interest from a plurality of images, pixel dimensions of each of the images being greater than pixel dimensions of a display area of an output device on which the area of interest is to be displayed, the area of interest comprising a polygon that encloses an object of interest selected by a user, the object of interest being captured in images captured by one or more of the plurality of cameras, and the plurality of cameras having overlapping fields of view such that images captured by the plurality of cameras have a plurality of overlapping regions, wherein the area of interest is different from the object of interest;
   transforming, by the one or more processors, a three-dimensional (3D) global location of the object of interest into a two-dimensional (2D) pixel position within an image of a specific camera of the plurality of cameras such that the area of interest
      (i) is centered around the pixel position corresponding to the global location of the object of interest,
      (ii) fits entirely within the display area of the output device, and
      (iii) is smaller than and wholly contained within the image captured by the specific camera; and
   extracting, by the one or more processors, from the image captured by the specific camera, the area of interest.

2. The method according to claim 1, further comprising, wherein the request further comprises the pixel dimensions of the display area of the output device.

3. The method according to claim 1, wherein the request is received through a network using network protocol, and wherein the request comprises an identifier of the object of interest.

4. The method according to claim 1, wherein the plurality of cameras are static.

5. The method according to claim 1, wherein the plurality of cameras are substantially color-matched.

6. The method according to claim 1, wherein the plurality cameras are substantially synchronized in time.

7. The method according to claim 1, wherein the plurality of cameras are arranged in a matrix configuration.

8. The method according to claim 1, further comprising processing the extracted area of interest to correct for distortion.

9. The method according to claim 1, further comprising generating a video codestream containing the area of interest by encoding the extracted area of interest into a video codestream.

10. The method according to claim 9, further comprising storing the video codestream memory.

11. The method according to claim 10, further comprising transmitting the video codestream to the client that made the request.

12. The method according to claim 9, further comprising storing the video codestream in a storage device.

13. The method according to claim 9, further comprising displaying the video codestream containing the area of interest on a display device.

14. The method according to claim 1, further comprising repeatedly determining a camera from among the plurality of cameras that wholly contains the area of interest using the global location of the object of interest; transforming the global location of the object of interest into a pixel position within an image of a specific camera of the plurality of cameras such that the area of interest is centered around the pixel position corresponding to the global location of the object of interest, and is wholly contained within the image captured by the specific camera; and extracting, from the image captured by the specific camera, the area of interest substantially centered around the pixel position corresponding to the global location of the object of interest until the request is cancelled.

15. The method according to claim 1, further comprising extracting a plurality of areas of interest from a plurality of images captured by the plurality of cameras.

16. The method according to claim 1, further comprising determining whether the object of interest is within a field of view of at least one camera in the plurality of cameras.

17. The method according to claim 1, further comprising determining whether the area of interest is contained within at least one overlapping region in the plurality of overlapping regions.

18. The method according to claim 1, wherein the object of interest moves from a field of view of one camera in the plurality of cameras to a field of view of another camera in the plurality of cameras.

19. The method according to claim 1, wherein each camera in the plurality of cameras captures a plurality of sequential images.

20. The method according to claim 19, wherein at least one of the plurality of sequential images contains the objects of interest.

21. The method according to claim 1, further comprising computing, by the one or more processors, the global location of the object of interest using data from a locator beacon associated with the object of interest.

22. The method according to claim 21, wherein the locator beacon comprises a Global Positioning System (GPS) device, an Inertial Measurement Unit (IMU), an optical sensor, an image pattern, or a marking, or any combination of two or more thereof.

23. The method according to claim 1, wherein the object of interest is a football player, a soccer player, a baseball player, a car, a horse, or a projectile.

24. A method of extracting an area of interest containing an object of interest from a plurality of images captured using a plurality of cameras, the method being implemented by a computer system that includes one or more processors configured to execute computer program instructions, the method comprising:
   determining, by the one or more processors, using a three-dimensional (3D) global location of the object of interest, a camera from among the plurality of cameras that wholly contains the area of interest, the area of interest comprising a polygon that encloses the object of interest, the object of interest being captured in one or more images captured by one or more of the plurality of cameras, and the plurality of cameras having overlapping fields of view such that images captured by the plurality of cameras have a plurality of overlapping regions, wherein the area of interest is different from the object of interest, and wherein pixel dimensions of each of the one or more images are greater than pixel dimensions of a display area of an output device on which the area of interest is to be displayed;
   transforming, by the one or more processors, the global location of the object of interest into a two-dimensional (2D) pixel position within an image of a specific camera of the plurality of cameras such that the area of interest (i) is centered around the pixel position corresponding to the global location of the object of interest, (ii) fits entirely within the display area of the output device, and (iii) is smaller than and wholly contained within the image captured by the specific camera; and
   extracting, by the one or more processors, from the image captured by the specific camera, the area of interest.

25. The method according to claim 24, further comprising computing, by the one or more processors, the global location of the object of interest using data from a locator beacon associated with the object of interest.

26. The method according to claim 25, wherein the locator beacon comprises a Global Positioning System (GPS) device, an Inertial Measurement Unit (IMU), an optical sensor, an image pattern, or a marking, or any combination of two or more thereof.

27. A computer system for selecting an area of interest from a plurality of images captured by a plurality of cameras, the system comprising one or more processors configured to execute computer program instructions such that the one or more processors:
   receive a request for an area of interest from a plurality of images, pixel dimensions of each of the images being greater than pixel dimensions of a display area of an output device on which the area of interest is to be displayed, the area of interest comprising a polygon that encloses an object of interest selected by a user, the object of interest being captured in images captured by one or more of the plurality of cameras, and the plurality of cameras having overlapping fields of view such that images captured by the plurality of cameras have a plurality of overlapping regions, wherein the area of interest is different from the object of interest;
   transform a three-dimensional (3D) global location of the object of interest into a two-dimensional (2D) pixel position within an image of a specific camera of the plurality of cameras such that the area of interest (i) is centered around the pixel position corresponding to the global location of the object of interest, (ii) fits entirely within the display area of the output device, and (iii) is smaller than and wholly contained within the image captured by the specific camera; and
   extract, from the image captured by the specific camera, the area of interest.

28. The system according to claim 27, further comprising, wherein the request further comprises the pixel dimensions of the display area of the output device.

29. The system according to claim 27, wherein the one or more processors are configured to receive the request through a network using network protocol.

30. The system according to claim 27, wherein the plurality of cameras are static.

31. The system according to claim 27, wherein the plurality of cameras are substantially color-matched.

32. The system according to claim 27, wherein the plurality cameras are substantially synchronized in time.

33. The system according to claim 27, wherein the plurality of cameras are arranged in a matrix configuration.

34. The system according to claim 27, wherein the one or more processors are configured to process the extracted area of interest to correct for distortion.

35. The system according to claim 27, wherein the one or more processors are configured to generate a video codestream containing the area of interest by encoding the extracted area of interest into a video codestream.

36. The system according to claim 35, further comprising a memory configured to store the video codestream.

37. The system according to claim 36, wherein the one or more processors are configured to transmit the video codestream to the client that made the request.

38. The system according to claim 35, further comprising a storage device configured to store the video codestream.

39. The system according to claim 35, wherein the one or more processors are configured to display the video codestream containing the area of interest on a display device.

40. The system according to claim 27, further comprising repeatedly determining a camera from among the plurality of cameras that wholly contains the area of interest using the global location of the object of interest; transforming the global location of the object of interest into a pixel position within an image of a specific camera of the plurality of cameras such that the area of interest is centered around the pixel position corresponding to the global location of the object of interest, and is wholly contained within the image captured by the specific camera; and extracting, from the image captured by the specific camera, the area of interest substantially centered around the pixel position corresponding to the global location of the object of interest until the request is cancelled.

41. The system according to claim 27, wherein the one or more processors are configured to extract a plurality of areas of interest from a plurality of images captured by the plurality of cameras.

42. The system according to claim 27, wherein the one or more processors are configured to determine whether the object of interest is within a field of view of at least one camera in the plurality of cameras.

43. The system according to claim 27, wherein the one or more processors are configured to determine whether the area of interest is contained within at least one overlapping region in the plurality of overlapping regions.

44. The system according to claim 27, wherein the object of interest moves from a field of view of one camera in the plurality of cameras to a field of view of another camera in the plurality of cameras.

45. The system according to claim 27, wherein each camera in the plurality of cameras captures a plurality of sequential images.

46. The system according to claim 45, wherein at least one of the plurality of sequential images contains the object of interest.

47. The system according to claim 27, wherein the one or more processors are configured to compute the global location of the object of interest using data from a locator beacon associated with the object.

48. The system according to claim 47, wherein the locator beacon comprises a Global Positioning System (GPS) device, an Inertial Measurement Unit (IMU), an optical sensor, an image pattern, or a marking, or any combination of two or more thereof.

49. The system according to claim 27, wherein the object of interest is a football player, a soccer player, a baseball player, a car, a horse, a projectile.

50. A computer system for extracting an area of interest comprising a polygon that encloses an object of interest from a plurality of images captured using a plurality of cameras, the computer system comprising one or more processors configured to execute computer program instructions such that the one or more processors:

determine using a three-dimensional (3D) global location of the object of interest, a camera from among the plurality of cameras that wholly contains the area of interest, the area of interest containing the object of interest, the object of interest being captured in one or more images captured by one or more of the plurality of cameras, and the plurality of cameras having overlapping fields of view such that images captured by the plurality of cameras have a plurality of overlapping regions, wherein the area of interest is different from the object of interest, and wherein pixel dimensions of each of the one or more images are greater than pixel dimensions of a display area of an output device on which the area of interest is to be displayed;

transform the global location of the object of interest into a two-dimensional (2D) pixel position within an image of a specific camera of the plurality of cameras such that the area of interest (i) is centered around the pixel position corresponding to the global location of the object of interest, (ii) fits entirely within the display area of the output device, and (iii) is smaller than and wholly contained within the image captured by the specific camera; and extract, from the image captured by the specific camera, the area of interest.

51. The system according to claim 50, wherein the one or more processors are configured to compute the global location of the object of interest using data from a locator beacon associated with the object of interest.

52. The system according to claim 51, wherein the locator beacon comprises a Global Positioning System (GPS) device, an Inertial Measurement Unit (IMU), an optical sensor, an image pattern, or a marking, or any combination of two or more thereof.

* * * * *